(12) United States Patent
Power et al.

(10) Patent No.: US 12,291,054 B2
(45) Date of Patent: May 6, 2025

(54) BANKNOTE AND A METHOD OF PRODUCING A PLURALITY OF BANKNOTES AND A PRINT PRESS FOR PRODUCING A PLURALITY OF BANKNOTES

(71) Applicant: CCL Secure Pty Ltd, Craigieburn (AU)

(72) Inventors: Gary Fairless Power, Craigieburn (AU); Ben Stevens, Craigieburn (AU)

(73) Assignee: CCL Secure Pty Ltd, Craigieburn (AU)

( * ) Notice: Subject to any disclaimer, the term of this patent is extended or adjusted under 35 U.S.C. 154(b) by 0 days.

(21) Appl. No.: 17/116,861

(22) Filed: Dec. 9, 2020

(65) Prior Publication Data
US 2021/0268827 A1 Sep. 2, 2021

Related U.S. Application Data

(63) Continuation of application No. 16/614,580, filed as application No. PCT/AU2018/050460 on May 16, 2018, now abandoned.

(30) Foreign Application Priority Data

May 17, 2017 (AU) ................................ 2017901840

(51) Int. Cl.
*B42D 25/324* (2014.01)
*B41F 11/02* (2006.01)
(Continued)

(52) U.S. Cl.
CPC ............ *B42D 25/351* (2014.10); *B41F 11/02* (2013.01); *B41M 3/14* (2013.01); *B42D 25/29* (2014.10);
(Continued)

(58) Field of Classification Search
CPC .............................. B42D 25/324; B41M 3/14
See application file for complete search history.

(56) References Cited

U.S. PATENT DOCUMENTS 5,449,200 A  9/1995  Andric
5,779,482 A * 7/1998  Fukumoto .............. G09B 21/02
                                              206/459.5
(Continued)

FOREIGN PATENT DOCUMENTS

AU          767233      11/2003
AU       2006233201      5/2008
(Continued)

OTHER PUBLICATIONS

RU-2450938-C2 English Translation (Year: 2012).*
(Continued)

*Primary Examiner* — Kyle R Grabowski
(74) *Attorney, Agent, or Firm* — Christopher M. Scherer; DeWitt LLP

(57) ABSTRACT

A banknote comprising a substrate and a plurality of print layers printed by the same print process type printed onto the substrate, wherein at least one of the print layers is an indicia layer and at least one of the print layers is a tactile layer. Also, a method of producing a plurality of banknotes including: providing a substrate, in the form of a web, to a print press including a plurality of print units of the same print process type, wherein the web will pass through each of the plurality of print units, and at least part of the web is printed in a print run; printing a print layer on to the substrate at each of the plurality of print units, wherein at least one of the print layers is an indicia layer and at least one of the print layers is a tactile layer.

14 Claims, 6 Drawing Sheets

(51) Int. Cl.
- *B41M 3/14* (2006.01)
- *B42D 25/29* (2014.01)
- *B42D 25/351* (2014.01)
- *B42D 25/373* (2014.01)
- *B42D 25/378* (2014.01)
- *B42D 25/387* (2014.01)
- *B42D 25/41* (2014.01)
- *C09D 11/101* (2014.01)
- *C09D 11/52* (2014.01)
- *B42D 25/328* (2014.01)
- *B42D 25/355* (2014.01)
- *B42D 25/364* (2014.01)

(52) U.S. Cl.
CPC ......... *B42D 25/373* (2014.10); *B42D 25/378* (2014.10); *B42D 25/387* (2014.10); *B42D 25/41* (2014.10); *C09D 11/101* (2013.01); *C09D 11/52* (2013.01); *B42D 25/324* (2014.10); *B42D 25/328* (2014.10); *B42D 25/355* (2014.10); *B42D 25/364* (2014.10); *Y10T 428/24802* (2015.01)

(56) References Cited

U.S. PATENT DOCUMENTS

| | | | |
|---|---|---|---|
| 6,346,321 B1 | 2/2002 | Stoeber | |
| 6,607,792 B1 | 8/2003 | Breger | |
| 6,713,164 B1* | 3/2004 | Hareyama | C08K 7/02 428/211.1 |
| 6,811,858 B1 | 11/2004 | Mayer | |
| 6,874,414 B2 | 4/2005 | Kaule | |
| 7,029,757 B1 | 4/2006 | Levy | |
| 7,654,578 B2 | 2/2010 | Reinhart | |
| 8,404,333 B2 | 3/2013 | Hagemann | |
| 8,877,328 B2 | 11/2014 | Bauer | |
| 2006/0124016 A1 | 6/2006 | Schaede | |
| 2008/0037401 A1 | 2/2008 | Kusaka | |
| 2008/0096143 A1 | 4/2008 | Quintens | |
| 2008/0122217 A1 | 5/2008 | Rancien | |
| 2010/0002303 A1 | 1/2010 | Vast | |
| 2010/0053287 A1 | 3/2010 | Belelie et al. | |
| 2010/0090455 A1 | 4/2010 | Boswell | |
| 2011/0049865 A1* | 3/2011 | Bray | B42D 25/00 283/114 |
| 2011/0117359 A1 | 5/2011 | Santos | |
| 2011/0239885 A1 | 10/2011 | Marchant | |
| 2012/0187673 A1 | 7/2012 | Stewart | |
| 2012/0202011 A1 | 8/2012 | Schulze-Hagenest et al. | |
| 2013/0305947 A1 | 11/2013 | Iftime et al. | |
| 2013/0323432 A1* | 12/2013 | Rygas | G07D 7/181 427/511 |
| 2015/0093149 A1 | 4/2015 | Tyagi et al. | |
| 2015/0146297 A1 | 5/2015 | Commander et al. | |
| 2015/0174945 A1 | 6/2015 | Garnier | |
| 2015/0376422 A1* | 12/2015 | Lefebvre | B41M 3/14 101/170 |
| 2018/0147880 A1* | 5/2018 | Lee | B42D 25/29 |

FOREIGN PATENT DOCUMENTS

| | | | |
|---|---|---|---|
| CA | 2577522 | 4/2006 | |
| CA | 2667081 | 1/2015 | |
| CA | 2659709 | 2/2015 | |
| CA | 2661570 | 6/2015 | |
| EP | 1689586 | 1/2014 | |
| GB | 2174313 | 11/1986 | |
| GB | 2457949 | 9/2009 | |
| RU | 2450938 C2 * | 5/2012 | ............. B42D 25/29 |
| WO | WO-9912742 A1 * | 3/1999 | ............. B41M 3/14 |
| WO | WO-2009036916 A1 * | 3/2009 | ............. B41C 1/05 |
| WO | 2010130755 | 11/2010 | |
| WO | WO-2010149476 A1 * | 12/2010 | ............. B42D 25/00 |
| WO | WO-2015128806 A1 * | 9/2015 | ............. D21H 19/38 |

OTHER PUBLICATIONS

WO-2009036916-A1 English Translation (Year: 2009).*
Gravure Printing https://www.lifewire.com/what-is-gravure-printing-1074611 (Year: 2020).*
WO-2015128806-A1 English Translation (Year: 2015).*
Gravure https://www.sciencedirect.com/topics/engineering/gravure-printing#:~:text=The%20thickness%20of%20the%20printed,et%20al.%2C%202014). (Year: 2017).*
WO-2010149476-A1 English Translation (Year: 2010).*
Gravure Printing hhttps://www.sciencedirect.com/topics/engineering/gravure-printing (Year:2015).
International Search Report for PCT/AU2018/050460 dated Aug. 3, 2018.
Search Report for FR1854095 dated Apr. 20, 2020.

* cited by examiner

BANKNOTE AND A METHOD OF PRODUCING A PLURALITY OF BANKNOTES AND A PRINT PRESS FOR PRODUCING A PLURALITY OF BANKNOTES

CROSS-REFERENCE TO RELATED APPLICATIONS

The present application is a continuation of U.S. application Ser. No. 16/614,580, filed Nov. 18, 2019, which application is the U.S. national stage application of International Application No. PCT/AU2018/050460, filed May 16, 2018, which international application was published on Nov. 22, 2018, as International Publication No. WO2018/209388. The International Application claims priority to Australian Patent Application No. 2017901840, filed May 17, 2017, the contents of which are incorporated herein by reference in their entireties.

TECHNICAL FIELD

The invention relates generally to a banknote, a method of producing a plurality of banknotes and a print press for producing a plurality of banknotes.

BACKGROUND OF INVENTION

At present, banknotes are produced using sequential printing processes involving different printing technologies. That is, a banknote substrate is subjected to a number of different types of printing processes in series, each one being completed before the next step is applied, requiring significant overhead in terms of handling and storage. The majority of the world's banknotes are printed using sheet fed systems, that is, the substrate is cut into sheets of a specified size and each sheet is printed in sequence. The nature of the printing processes used is such that they require a period of time between each of the different printing steps. The reason for the time between steps is because of the inks used in the individual processes. Whilst some of the processes use inks which are cured using actinic radiation, most are based upon oxidative systems which take a period of time before the inks are sufficiently polymerised as to be useful and robust enough to perform as a banknote. This is particularly the case where Intaglio printing is used to create tactile designs. Intaglio processes in banknote production deliver print heights in the order of 20 to 60 microns or more and the sheets must be allowed to dry without being placed in a stack, as this would cause the wet ink to be flattened.

The typical process is described below:
a. Off-set printing (wet or dry) to provide the background patterns
b. Intaglio printing for the main imagery/portrait of the note
C. Numbering (Letterpress printing)
d. Overcoating
e. Inspection
f. Cutting/guillotining.

There can be additional steps, in that additional security features may be added using distinct and separate processes, such as silk screen and hot stamping. Each of the above steps generally require a separate process with dedicated equipment, personnel, additional time management, skill and ink/application chemistry.

There have been attempts to combine these to a single process such as the Goebels reel to reel off-set and intaglio press as well as the SNOW (Single Note On Web) concept. Both of these systems attempt to provide the different process steps referred to above in an in-line system. That is, each different type of printing process is placed in an in-line system. Technical, quality and cost issues have prevented these processes from being successful.

In addition, each of these process steps adds considerable cost and time to manufacture a banknote. The time component can be one month or more, which means holding one month of work-in-process with staffing overhead requirements of at least two and normally three or more dedicated operators per process, as well as security costs to manage and store the volume of materials required. All of the above adds to the excessive cost and time to produce a banknote. These costs, in some cases, can be in excess of the face value of the banknote itself.

There is also a requirement for each individual process to register to the previous process. The very nature of sheet fed processes results in variation of, not only, the placement of the sheet during the various processes but also the mounting of the various blankets, plates and the like. This in turn requires the customer and the designer of the banknotes to tolerate lower than desired levels of precision between the substrate, the security devices and the security printing. These tolerances can be as high as 1.4 mm. Cutting processes employed during substrate manufacture further exacerbate this to the extent that the sheets can be cut skewed relative to the design further increasing the need for even greater downstream accommodation of the design at the cost of security to the document. Variations in tolerances undermine the security of the banknote in that a counterfeiter can take advantage of this to produce low quality replicas of the original documents.

Commercially available banknotes, at present, are formed using starting materials which consist of one of the following:

a. The production of a fibrous material to produce a mostly opaque, porous substrate (paper or the like, but also the likes of Tyvek® from DuPont, which was unsuccessfully used with banknotes in the 1980s)
b. The extrusion lamination of one or more sheets of fibrous material over a clear polymeric layer(s). The fibrous layers may have had aperture prepared in them during the process to create a transparent region or window (Durasafe® Landqart—US20060198987A1)
c. The lamination of one or more polymer layers to a fibrous (paper) layer and then optional cutting apertures in the paper before or after lamination to create a transparent region. This process can have one or more coatings layers of opacifying ink added to the surface of the polymer layers so as to create an ink receptive layer (Hybrid™ Giesecke and Devrient)
d. A transparent polymer substrate which is selectively opacified by the application of one or more layers of opacifying ink (Guardian™ CCL Secure, formerly Innovia Security, formerly Securency).

All of the above are produced, cut into sheets, and, subsequently, are placed into the various printing processes described earlier (offset, intaglio, numbering, etc.).

All commercially available banknotes at present are formed using starting materials which consist of one of the following:

a. The banknotes are produced using an indicia inks chemistry based upon a number of the systems, but the majority or these are based upon air oxidation inks. Namely oil based inks which oxidised in the presence of air and metal soaps to from cross-linked structures. There is an increasing use of inks cured using actinic radiation.

b. The inks used for polymeric and hybrid structures are of a different chemistry and usually involve crosslinking using a range of curing chemistry, commonly resulting in a highly crosslinked high molecular weight polymer system.

c. There is, more often than not, a considerable period of time (greater than one day and usually at least 3 days) from the time that a substrate is produced to the time that it is printed. This is in part due to the need for the substrate coatings to cure and/or coalesce.

d. During this time, not only does the material's surface increase in molecular weight, it can also decrease in surface energy value. These are desirable properties from a robustness point of view of the surface.

e. This process however reduces the ability of the inks applied to the surface to penetrate the surface and gain full adhesion.

f. The disparate nature of the inks applied to the surface in the form of printed indicia further reduces the adhesion between the surface of the material and the indicia inks.

g. The relatively low molecular weight of the crosslinked system of the indicia ink relative to the surface ink results in the indicia ink being softer than the surface materials and therefore more prone to wear relative to the surface material in the same environment.

h. To overcome this banknotes are increasingly overcoated with a one or two layer coating system per surface, after printing, so as to prevent the indicia wearing out too quickly. This process is expensive to carry out and does not resolve the issue but tends to minimise it. A hard coating on top of a, relatively, softer coating will stop certain types of wear but not address all wear situations.

All of the above have a disadvantage of cost, process or material properties (opacity, durability) or a combination of some or all of these. This is made worse by the fact that the banknote then has an entire separate set of steps to undergo to become a final security document.

Whilst some prior art disclosures refer to the option of printing security documents, including banknotes, in a web-fed system/roll to roll system, none of the prior art disclosures discuss any specifics of how to implement such a system. For example, in U.S. Pat. No. 4,536,016A, column 4, lines 21 to 26, state that the substrate according to this disclosure can be printed by normal high quality presses for the production of banknotes and state that these could be sheet fed presses or web fed presses. This disclosure is already a multistep process but then gives no direction as to how to achieve banknotes in a web-fed press. It is also common to produce individual security features in a roll-to-roll process and, indeed, to produce substrate suitable for polymer banknotes, such as Guardian® substrate. However, the challenges of producing a suitable roll-to-roll banknote are not addressed by any of the prior art nor are any solutions to the challenges disclosed. In addition, improvements to banknotes may be achievable using a roll-to-roll web fed system, which, again, are not addressed in the prior art.

SUMMARY OF INVENTION

The present invention seeks to obviate, ameliorate or provide an alternative to prior art banknotes, methods of producing banknotes and/or banknote security features.

According to a first aspect of the present invention, there is provided a method of producing a plurality of banknotes including: providing a substrate, in the form of a web, to a print press including a plurality of print units of the same print process type, wherein the web will pass through each of the plurality of print units, and at least part of the web is printed in a print run; printing a print layer on to the substrate at each of the plurality of print units, wherein at least one of the print layers is an indicia layer and at least one of the print layers is a tactile layer.

According to a second aspect of the present invention, there is provided a method of producing a plurality of banknotes including:

providing a substrate, in the form of a web, to a print press including a plurality of print units of the same print process type, passing the web through at least two of the plurality of print units, and at least part of the web is printed in a print run;

the print run comprising printing a print layer on to the substrate with at least two of the plurality of print units, wherein at least one of the print layers is an indicia layer and at least one of the print layers is a tactile layer.

The first and second aspects of the present invention have the particular advantages that banknotes can be produced: in a single process; more quickly that with current methods; and/or at a lower cost that current methods, whilst also maintaining the security provisions of comparative prior art banknotes.

The first and/or second aspects of the present invention provide for banknotes which can be printed, on at least one side, in a single step. This method speeds up manufacture and improves registration accuracy through providing indicia and tactile elements in a continuous web based print process.

The following embodiments may apply to the first and or second aspects of the invention.

In an embodiment, the substrate comprises a polymeric material. Suitable polymeric material include but are not limited to polypropylene (PP), polyethylene (PE), polycarbonate (PC), polyvinyl chloride (PVC), polyethylene terephthalate (PET), biaxially-oriented polypropylene (BOPP); or a composite material of two or more such materials.

In an embodiment, the tactile layer is a paper-feel layer printed on the substrate which provides a feel substantially similar to that of a paper banknote. In an embodiment, the tactile layer is a transparent or translucent paper-feel layer.

A tactile layer such as this has the advantage of providing greater acceptability to the public, because it feels more similar to traditional banknotes, and also reduces the tendency of polymer banknotes to stick together.

In an embodiment, the paper-feel layer includes an ink having tactile particles. In an embodiment, the tactile particles have an average particle size of 5 to 35 microns in at least one dimension. In an embodiment, the tactile particles have an average particle size aspect ratio between substantially 1 and 5.

In an embodiment, the paper-feel layer contains substantially 5% to 20% by weight of tactile particles to ink, further preferably, substantially 10% to 15%. In an embodiment, the tactile particles are made from one or a combination of polyethylene, polypropylene, glass, acrylic, polyurethane, ceramic or rubber.

In the context of this specification, percentage weights are given of "wet" inks, prior to curing processes, such as those which may evaporate elements of the ink, such as solvents.

In an embodiment, the paper-feel layer comprises average particle depth to binder depth ratio in the range 3:1 to 7:1. In an embodiment, the paper-feel layer is applied at a first thickness in first regions and a second thickness in second regions, the second regions providing enhanced tactility.

In an embodiment, the paper-feel layer is conductive. In one embodiment, the tactile particles are conductive. In another embodiment, the paper-feel layer includes conductive particles in addition to the tactile particles.

In an embodiment, the amount of conductive particles is suitably determined so that the paper-feel layer has a volume resistivity of less than 100 Ωcm, preferably $10^{-2}$ to 10 Ωcm.

In an embodiment, the conductive particles are a fibrous conductive filler being a fibrous core material with a conductive layer formed thereon, preferably, the conductive particles containing at least a tin oxide and an antimony oxide.

In an embodiment, the fibrous conductive filler particles have an average length of 3 to 50 microns, preferably, the fibrous conductive filler particles have an average diameter of 0.01 to 5 microns, and, further preferably, the fibrous conductive filler particles have an average aspect ratio of 3 to 100.

In an embodiment, the conductive particles are provided in the paper-feel layer at a concentration of substantially 10% to 15% by weight.

In an embodiment, the indicia layer, or a further indicia layer, includes a design element and the tactile layer, or a further tactile layer, is an enhanced tactility layer, or includes regions of enhanced tactility, which has at least a first enhanced tactility area printed substantially on the design element, such that the design element appears to have tactility due to the first enhanced tactility area, the design element and the first enhanced tactility area together forming a security feature. The enhanced tactility layer may be substantially transparent or translucent in this embodiment.

In an embodiment, the first enhanced tactility area has extremities substantially no greater than the extremities of the design element.

In an embodiment, the first enhanced tactility area comprises a pattern of sub-areas of enhanced tactility, preferably the sub-areas are lines and/or dots.

In an embodiment, the enhanced tactility layer contains tactile particles, preferably the tactile particles have at least one dimension which has an average size of 5 to 70 microns, or in an alternative embodiment 10 to 70 microns.

In an embodiment, the tactile particles have an average diameter of substantially 20 microns and, further preferably, are spherical. In another embodiment, the tactile particles have at least one dimension which has an average size at least 150% of the average size of the smallest dimension.

In an embodiment, the tactile particles are retroreflective, or semi-retroreflective.

In an embodiment, each of the print layers printed by the plurality of print units is printed with an ink having a Relative Energy Difference, to any other ink of the print layers, of less than or equal to one, or less than or equal to 0.5, such as less than or equal to 0.3.

In an embodiment, each of the inks have a Hansen Solubility "Hydrogen bonding" parameter, $\delta h$, having a difference of less than 2.5 to any other ink of the print layers.

In an embodiment, each print layer is printed in-line before the immediately preceding print layer has completed curing and/or coalescing, the effect of which is that where print layers overlap, the print layers partially dissolve into one another.

In an embodiment, the print press is a Gravure print press. In an embodiment, each of the plurality of print units is a Gravure print unit.

In an embodiment, the print press comprises one or more further print units of a different print process type to the plurality of print units, and the method further comprises printing a print layer on to the substrate at the further print units in the print run. In an embodiment, the method comprises printing a different print layer design on at least two of the plurality of banknotes, preferably on each of the plurality of banknotes, at each further print unit. In an embodiment, at least one further print unit is an ink jet print unit. In an embodiment, the ink jet print unit prints a unique image and/or text onto each banknote. In an embodiment the ink jet print unit prints a unique serial number on each banknote.

In an embodiment, the web of substrate is treated to promote adhesion prior to printing, at least, a first print layer.

In an embodiment, the treatment comprises application of corona discharge.

In an embodiment or a further embodiment, the treatment is printing of an adhesion promoting layer.

In an embodiment, further including the step of inspecting the web during the print run including; imaging at least one of the print layers; and quantifying the print quality and/or registration of the print layer.

According to a third aspect of the present invention, there is provided a banknote produced by the first and/or second aspect of the present invention. Embodiments of the third aspect of the invention may therefore include any of the embodiments of the first and second aspects of the invention.

According to a fourth aspect of the present invention, there is provided a banknote having at least two indicia layers or at least one indicia layer and at least one tactile layer, each printed with an ink having: a Relative Energy Difference, to the inks of the other said layer(s), of less than or equal to one, preferably less than or equal to 0.5, or less than or equal to 0.3; and/or Hansen Solubility parameters within the following ranges: $\delta d$—between 17 and 19, $\delta p$—between 9 and 11 and $\delta h$—between 5 and 7.

In an embodiment, each of the inks has a Hansen Solubility "Hydrogen bonding" parameter, $\delta h$, having a difference of less than 2.5 to any other ink of said layers.

In an embodiment, each of said layers is printed in-line before the immediately preceding layer has completed curing and/or coalescing, such that where layers overlap, the layers partially dissolve into one another.

In an embodiment, the substrate is a polymeric material. Suitable polymeric material include but are not limited to polypropylene (PP), polyethylene (PE), polycarbonate (PC), polyvinyl chloride (PVC), polyethylene terephthalate (PET), biaxially-oriented polypropylene (BOPP); or a composite material of two or more such materials In an embodiment, the banknote includes a tactile layer wherein the tactile layer is a paper-feel layer printed on the banknote which provides a feel, substantially similar to that of a paper banknote. In an embodiment, the tactile layer is printed with an ink having a Relative Energy Difference, to all other inks of the other print layers, of less than or equal to one, such as less than or equal to 0.5, or less than or equal to 0.3.

In an embodiment, the paper-feel layer includes tactile particles, preferably, the tactile particles are 5 to 35 microns in depth, and, further preferably, the tactile particles have an aspect ratio between substantially 1 and 5.

In an embodiment, the paper-feel layer contains substantially 5% to 20% by weight of tactile particles to transparent ink, preferably, substantially 10% to 15%. In an embodiment, the tactile particles are made from one or a combination of polyethylene, polypropylene, glass, acrylic, polyurethane, ceramic or rubber.

In an embodiment, the paper-feel layer comprises average particle depth to binder depth ratio in the range 3:1 to 7:1. In an embodiment, the paper-feel layer is applied at a first thickness in first regions and a second thickness in second regions, the second regions providing enhanced tactility.

In an embodiment, the paper-feel layer includes conductive particles.

In an embodiment, the amount of conductive particles is suitably determined so that the paper-feel layer has a volume resistivity of less than 100 Ωcm, preferably $10^{-2}$ to 10 Ωcm.

In an embodiment, the conductive particles are a fibrous conductive filler being a fibrous core material with a conductive layer formed thereon, preferably, the conductive particle containing at least a tin oxide and an antimony oxide.

In an embodiment, the fibrous conductive filler particles have an average length of 3 to 50 microns, preferably, the fibrous conductive filler particles have an average diameter of 0.01 to 5 microns, and, further preferably, the fibrous conductive filler particles have an average aspect ratio of 3 to 100.

In an embodiment, the conductive particles are provided in the paper-feel layer at a concentration of substantially 10% to 15% by weight.

In an embodiment, the at least two print layers include an indicia layer and a tactile layer, and the indicia layer, or a further indicia layer, includes a design element and the tactile layer, or a further tactile layer, is an enhanced tactility layer, or includes regions of enhanced tactility, which has at least a first enhanced tactility area printed substantially on the design element, such that the design element appears to have tactility due to the first enhanced tactility area, the design element and the first enhanced tactility area together forming a security feature. In an embodiment, the tactile layer is a transparent or translucent paper-feel layer.

In an embodiment, the first enhanced tactility area has extremities substantially no greater than the extremities of the design element.

In an embodiment, the first enhanced tactility area comprises a pattern of sub-areas of enhanced tactility, preferably the sub-areas are lines and/or dots.

In an embodiment, the enhanced tactility layer contains tactile particles, preferably the tactile particles have at least one dimension which has an average size of 5 to 70 microns.

In an embodiment, the tactile particles have an average diameter of substantially 20 microns and, further preferably, are spherical.

In an embodiment, the tactile particles are retroreflective, or semi-retroreflective.

In an embodiment, each print layer is a gravure-printed layer. In an alternative embodiment, at least one print layer is a gravure-printed layer, and at least one print layer is an ink jet-printed layer.

According to a fifth aspect of the present invention, there is provided a banknote having a substrate with polymeric outer surfaces, including a coating wherein the coating is a paper-feel layer applied to at least one of the outer surfaces which provides a feel, substantially similar to that of a paper banknote, wherein the paper-feel layer includes tactile particles, to provide the paper-feel, and the tactile particles are conductive and/or the paper-feel layer includes conductive particles, to improve anti-static properties of the banknote.

In an embodiment, the tactile particles are 5 to 35 microns in depth, and, further preferably, the particles have an aspect ratio between substantially 1 and 5.

In an embodiment, the tactile particles, at least on average, have a dimension in at least one direction which is greater than 150% of the smallest dimension.

In an embodiment, the paper-feel layer contains substantially 5% to 20% by weight of tactile particles to ink, preferably, substantially 10% to 15%. In an embodiment, the tactile particles are made from one or a combination of polyethylene, polypropylene, glass, acrylic, polyurethane, ceramic or rubber.

In an embodiment, the paper-feel layer comprises average particle depth to binder depth ratio in the range 3:1 to 7:1. In an embodiment, the paper-feel layer is applied at a first thickness in first regions and a second thickness in second regions, the second regions providing enhanced tactility.

In an embodiment, the amount of conductive particles is suitably determined so that the paper-feel layer has a volume resistivity of less than 100 Ωcm, preferably $10^{-2}$ to 10 Ωcm.

In an embodiment, the conductive particles are a fibrous conductive filler being a fibrous core material with a conductive layer formed thereon, preferably, the conductive particle containing at least a tin oxide and an antimony oxide.

In an embodiment, the fibrous conductive filler particles have an average length of 3 to 50 microns, preferably, the fibrous conductive filler particles have an average diameter of 0.01 to 5 microns, and, further preferably, the fibrous conductive filler particles have an average aspect ratio of 3 to 100.

In an embodiment, the conductive particles are provided in the paper-feel layer at a concentration of substantially 10% to 15% by weight.

In an embodiment, the coating is applied all over the banknote, such that the banknote has a paper-feel layer all over, but it may be applied selectively for design or process considerations. For example, where the banknote has a clear window, or other security feature, it may be chosen to not print the coating in that area.

In an embodiment, the coating is an outer coating.

In an embodiment, the coating includes a UV curable ink.

In an embodiment, the coating includes a solvent based ink.

According to a sixth aspect of the present invention, there is provided a banknote having a coating wherein the coating is a transparent or translucent layer applied on the banknote which includes conductive particles.

In an embodiment, the coating is an outer coating.

In an embodiment, the amount of conductive particles is suitably determined so that the coating has a volume resistivity of less than 100 Ωcm, preferably $10^{-2}$ to 10 Ωcm.

In an embodiment, the conductive particles are a fibrous conductive filler being a fibrous core material with a conductive layer formed thereon, preferably, the conductive particle containing at least a tin oxide and an antimony oxide.

In an embodiment, the fibrous conductive filler particles have an average length of 3 to 50 microns, preferably, the fibrous conductive filler particles have an average diameter of 0.01 to 5 microns, and, further preferably, the fibrous conductive filler particles have an average aspect ratio of 3 to 100.

In an embodiment, the conductive particles are provided in the coating at a concentration of substantially 10% to 15% by weight.

According to a seventh aspect of the present invention, there is provided a banknote having a substrate with polymeric outer surfaces, including a coating wherein the coating is a tactile layer applied to at least a portion of one of the outer surfaces having tactile particles which are 5 to 35 microns in at least one dimension, and, further preferably, the tactile particles have an aspect ratio between substantially 1 and 5, wherein the tactile layer is applied at a first thickness in first regions and a second thickness in second regions.

In an embodiment, the tactile particles, at least on average, have a dimension in at least one direction which is greater than 150% of the smallest dimension.

In an embodiment, the tactile particles provide a feel, substantially similar to that of a paper banknote, in at least the first regions.

In an embodiment, the tactile layer includes conductive particles. In an embodiment, the conductive particles are a fibrous conductive filler being a fibrous core material with a conductive layer formed thereon, preferably, the conductive particle containing at least a tin oxide and an antimony oxide.

In an embodiment, the fibrous conductive filler particles have an average length of 3 to 50 microns, preferably, the fibrous conductive filler particles have an average diameter of 0.01 to 5 microns, and, further preferably, the fibrous conductive filler particles have an average aspect ratio of 3 to 100.

In an embodiment, the amount of conductive particles is suitably determined so that the paper-feel layer has a volume resistivity of less than 100 Ωcm, preferably $10^{-2}$ to 10 Ωcm.

In an embodiment, the conductive particles are provided in the paper-feel layer at a concentration of substantially 10% to 15% by weight.

In an embodiment, the coating includes a UV curable ink.

In an embodiment, the coating includes a solvent based ink.

According to an eighth aspect of the invention there is provided a tactile security feature for a banknote including a printed design layer having a print depth of 5 microns or less, a printed tactile layer, having tactile particles, printed over the design layer, the tactile layer giving apparent tactility to the design layer.

According to a ninth aspect of the present invention, there is provided a tactile security feature for a banknote having a printed indicia layer including a design element and a printed enhanced tactility layer, which has at least a first enhanced tactility area overlapping/overlying the design element, such that the design element appears to have tactility due to the overlapping/overlying first enhanced tactility area, the design element and the first enhanced tactility area together forming the security feature.

In an embodiment, a lateral extent of the first enhanced tactility area substantially corresponds to a lateral extent of the design element In an embodiment, the enhanced tactility layer contains tactile particles, preferably the tactile particles have at least one dimension which has an average size of 5 to 70 microns.

In an embodiment, the tactile particles are made from one or a combination of polyethylene, polypropylene, glass, acrylic, polyurethane, ceramic or rubber.

In an embodiment, the tactile particles have an average diameter of substantially 20 microns and, further preferably, are spherical.

In an embodiment, the tactile particles are 5 to 35 microns in at least one dimension, and, further preferably, the tactile particles have an aspect ratio between substantially 1 and 5, wherein the tactile layer is applied at a first thickness in first regions and a second thickness in second regions.

In an embodiment, the tactile particles, at least on average, have a dimension in at least one direction which is greater than 150% of the smallest dimension.

In an embodiment, the tactile particles are retroreflective, or semi-retroreflective.

According to a tenth aspect of the invention there is provided a print press for producing a plurality of banknotes on a continuous web of substrate, the print press including a plurality of print units of the same print process type, the plurality of print units comprising at least one print unit configured to print an indicia layer and at least one print unit configured to print a tactile layer on the substrate in a same print run.

Embodiments of the tenth aspect of the invention may include embodiments corresponding to any of the preceding aspects, in particular the first or second aspect.

In an embodiment, each of the plurality of print units is a Gravure print unit, and, in a further embodiment, a gravure cylinder of the at least one print unit configured to print a tactile layer is configured to print an ink containing particles.

In an embodiment, the printing press comprises a plurality of print units configured to print indicia layers on the substrate, and, in a further embodiment, a plurality of print units configured to print tactile layers on the substrate. In one embodiment, the printing press comprises a corresponding plurality of drying units.

In an embodiment, the print press comprises a first plurality of print units configured to print at least one indicia layer and at least one tactile layer on a first surface of the substrate, a turner bar to turn over the substrate after it has passed through the first plurality of print units, and a second set of print units configured to print at least one indicia layer and at least one tactile layer on a second surface of the substrate after it has been turned over by the turner bar.

In an embodiment, the print press comprises one or more further print units of a different print process type to the plurality of print units. In an embodiment, at least one further print unit is configured to print a different print layer design on at least two of the plurality of banknotes on the continuous web of substrate, preferably on each of the plurality of banknotes. In an embodiment, at least one further print unit is an ink jet print unit.

In an embodiment, the print press comprises a corona machine which treats both surfaces of the substrate to corona discharge to increase the adhesive properties of the surface of the substrate. The print press may optionally comprise an inspection system, and may further optionally comprise a guillotine machine to cut the continuous web of substrate into sheets. Alternatively, the print press may comprise a rewind system configured to retain the continuous web of substrate after it has been printed.

Definitions

Banknote

As used herein the term banknote is a reference to all documents of value used in transactions. Banknotes are a special case of security documents, as they are numerous in quantity, are highly transacted and are subjected to high wear. Due to the high wear, solutions appropriate for other security documents are often not appropriate for banknotes, particularly where adhesion of an element, such as printed ink or a security features, to the banknote substrate is concerned.

Security Device or Feature

As used herein the term security device or feature includes any one of a large number of security devices, elements or features intended to protect the banknote from counterfeiting, copying, alteration or tampering. Security devices or features may be provided in or on the substrate of the banknote or in or on one or more layers applied to the base substrate, and may take a wide variety of forms, such as security threads embedded in layers of the banknote; security inks such as fluorescent, luminescent and phosphorescent inks, metallic inks, iridescent inks, photochromic, thermochromic, hydrochromic or piezochromic inks; printed and embossed features, including relief structures; interference layers; liquid crystal devices; lenses and lenticular structures; optically variable devices (OVDs) such as diffractive devices including diffraction gratings, holograms and diffractive optical elements (DOEs).

Substrate

As used herein, the term substrate refers to the base material from which the banknote is formed. The base material, unless otherwise specified, may be paper or other fibrous material such as cellulose; a plastic or polymeric (the two terms being interchangeable) material including but not limited to polypropylene (PP), polyethylene (PE), polycarbonate (PC), polyvinyl chloride (PVC), polyethylene terephthalate (PET), biaxially-oriented polypropylene (BOPP); or a composite material of two or more materials, such as a laminate of paper and at least one plastic material, or of two or more polymeric materials. In particular, the base material may be a polymeric film opacified during manufacture, such as by the addition of titanium dioxide or the creation or air bubbles.

Opacifying Layers

One or more opacifying layers may be applied to a transparent or translucent substrate to increase the opacity of the security document. An opacifying layer is such that $L_T<L_0$, where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Paper-Feel

The term "paper-feel" as used herein refers to a particular tactual sensation (tactility) or haptic property on the part of the cured, printed surface. Since the haptic paper-feel properties are typically measured by human touch, they are somewhat subjective. More common in the coatings industry is the use of the term "soft-feel" and, in some cases a "paper soft feel", and the term "paper-feel" is a subset of "soft-feel". Overall, a layer or print described as having a "paper-feel" indicates that the surface of the layer described as having a similar feel to that of a similar paper-based product, in which the surface roughness of the paper product is detectable by the human sense of touch. As such, a paper-feel layer or print represents an increase in surface roughness for polymer substrates, which are typically very smooth. One method of quantifying this surface roughness is through measurements of the coefficient of friction. Particularly relevant to the term "paper-feel" as used herein is a comparison with paper banknotes. Different paper banknotes have different coefficient of frictions. For example, a US one dollar bill has a value of 0.1716, a 10 Euro banknote has a value of 0.1078 and a 10,000 Korean won has a value of 0.1563[1] (noting that these measurements are the banknotes versus a "Teflon®" tip, used as an approximation to the human finger). It is reasonable in this context, that paper-feel is, at least, a coating which has a coefficient of friction between approximately 0.1 and 0.2 from this data. An alternative measure of coefficient of friction is "note to note", that is the coefficient of friction of one banknote versus another banknote. A suitable specification for this measure of coefficient of friction is 0.2 to 0.4, which has been confirmed through measurements (additional detail below).

[1]Song, Han Wook & Woo, Sam Yong & Kyu Park, Yon & Lee, Sungjun. (2008). "Measurements of the Friction Coefficient for Banknotes". MAPAN—Journal of Metrology Society of India. 23.

Print Processes

There are many different print process types used to print on substrates. As outlined above, for the traditional banknote industry, the typical print process types which are followed are sheet-fed offset and sheet-fed intaglio. That is, substrate is supplied in sheets to an offset print press and then, separately, to an intaglio print press. Other print process types which are commonly found both inside and outside the security industry are letterpress, gravure, flexographic and ink jet. All of these print processes require particular types of substrate supply, print equipment and inks. In general, whilst all print process types can be configured to be fed by a web of substrate, the print process types which can run at the highest speeds, and therefore lowest costs, are flexographic and gravure. As is discussed in greater detail below, intaglio printing can be used generically to cover printing techniques in which an image is incised into a surface and the incised line or sunken area holds the ink for printing. However, in printing, and particularly security printing, a distinction is made between gravure (also known as rotogravure) and intaglio (also known as line intaglio) print process types. The skilled person in the art of security printing would immediately understand that an intaglio print process involves high viscosity ink applied to lines incised into a intaglio print plate which is applied at great pressure to the substrate. Likewise, the skilled person in the art of security printing would immediately understand that a gravure print process refers to lower viscosity inks captured from a bath of ink by a cylinder with "cells" engraved in the cylinder and applied to a substrate web. Accordingly, any reference to print units of the same print process type in this specification refers to print units being one of a particular print process, as in the examples given above, as would be readily recognised by a person skilled in the art of security printing.

BRIEF DESCRIPTION OF DRAWINGS

Embodiments of the invention will now be described with reference to the accompanying drawings. It is to be understood that the embodiments are given by way of illustration only and the invention is not limited by this illustration. In the drawings.

DETAILED DESCRIPTION

Figure 1A:
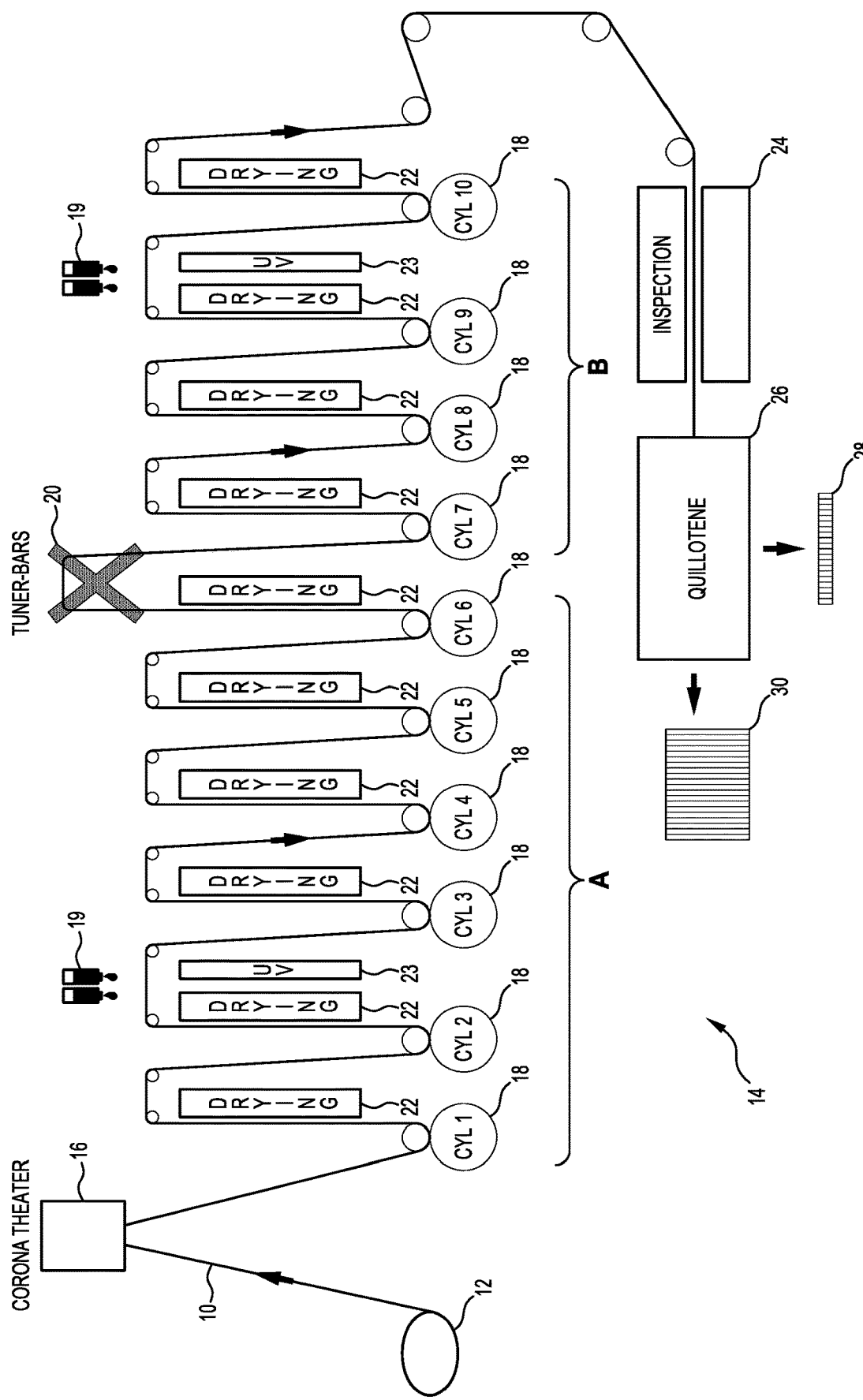
FIG. 1A is a schematic illustration of a print press configured to produce a banknote according to at least one aspect of the present invention.

As indicated above, there are many disadvantages associated with the known methods of production of banknotes. Particularly, separate print processes are required which increase the cost and the length of time to produce banknotes with little or no addition in security. That is to say, the fact that separate print processes are used is not considered a deterrent to the counterfeiter.

However, there are a number of characteristics which the general public recognise when handling banknotes, separate from specific security features. These are: quality of print; and the "feel" of the banknote. The quality of print on modern banknotes is not a bar to counterfeit banknotes but, in general, the public will immediately be suspicious of banknotes which do not have a high quality of print. As such, it acts as a first indicator and counterfeiters often do produce counterfeits which are of poor quality. The "feel" of the banknote comes down to a number of factors but, particularly, the substrates and print used on banknotes have remained similar for many years, so the public trusts banknotes which feel similar to those which they have handled previously.

The "feel" of a conventional banknote, typically, comes from two different sources. The substrate that the banknote was made out of and the Intaglio print design used on the banknote. Traditional paper substrates feel slightly rougher than more modern polymer banknotes, particularly in areas in which there is no Intaglio print. The offset print used for background designs leaves no noticeable feel characteristic and tends to represent the feel of the substrate on which it has been printed. Banknotes which have no Intaglio print feel very smooth compared to those which do.

It is important to note that intaglio printing can be used generically to cover printing techniques in which an image is incised into a surface and the incised line or sunken area holds the ink for printing. However, in printing, and particularly security printing, a distinction is made between gravure, or rotogravure, and intaglio, or line intaglio. In gravure, the printing surfaces are cylinders which are produced, for example by electron beam, laser beam or engraver. It is distinctive for gravure that different grey or colour values of the printed image are produced by cells of different density, size and/or depth disposed regularly in the cylinder. A signature of gravure printing is the slightly jagged edge in a straight line, typically only visible under magnification, which is an artefact of the cell structure. This is also visible in tonal variation of an image. An important aspect of gravure printing is selecting appropriate cell structures and repeats, or line screens, of the cells.

In contrast, in intaglio linear depressions are formed in the printing plates to produce a printed image. In the mechanically fabricated plate for line intaglio, a wider line is produced with increasing engraving depth due to the usually tapered engraving tools. Furthermore, the ink receptivity of the engraved line and thus the opacity of the printed line increases with increasing engraving depth. In the etching of intaglio plates, the nonprinting areas of the plate are covered with a chemically inert lacquer. Subsequent etching produces the engraving in the exposed plate surface, the depth of the engraved lines depending in particular on etching time and line width. Due to the depths used, the type of ink and the pressures required to print intaglio are extremely different to that of gravure. As such, the throughput of gravure, which is typically a web based, roll to roll, process is considerably higher.

The intaglio technique, in particular the steel intaglio technique, provides a characteristic printed image that is easily recognizable to laymen and, typically, is not considered to be re-reproducible with other common printing processes. If the engravings in the printing plate are deep enough, a data carrier printed by intaglio is given, through embossing, due to the large pressures used, and inking, a printed image that forms a relief perceptible with the sense of touch.

Figure 1B:
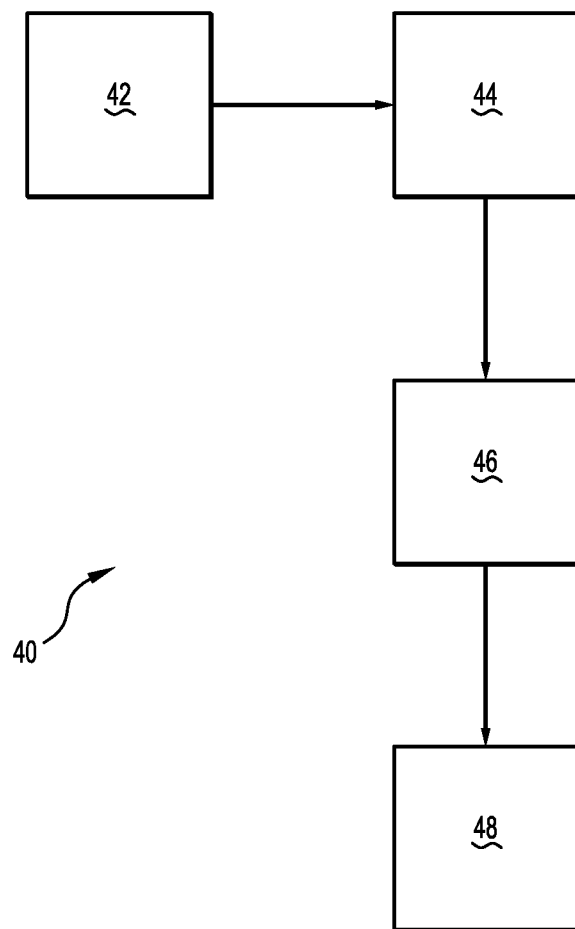
FIG. 1B is a flow diagram of a method of producing a banknote according to at least one aspect of the present invention.

A Method of Producing a Banknote and a Print Press for Producing a Plurality of Banknotes Referring now to FIGS. 1A and 1B, aspects of the present invention being a method of producing a plurality of banknotes and a print press for producing a plurality of banknotes are described. With respect to FIG. 1A, a substrate 10, in the form of a continuous web of polymer material, is on a roll 12 at one end of a print press 14. In this example, the print press 14 is a gravure print press, in that the printing process used to apply print layers is gravure printing. The substrate 10 is unwound from the roll 12 and passes into the print press 14. The print press 14 comprises a corona discharge machine 16, a plurality of gravure print units 18 and a turner bar 20. The substrate 10 is fed to the corona machine 16, which treats both surfaces of the substrate 10 to corona discharge which increases the adhesive properties of the surface of the substrate 10 or coatings thereon. From the corona machine 16, the substrate 10 is fed to a first set A of the print units 18 before being turned over at the turner bar 20 and then to a second set B of the print units 18. Each print unit 18 applies a print layer to the substrate 10. Each print unit 18 has a corresponding drying or curing unit 22. In this example, the drying unit 22 comprises an air heater which raises the temperature of the substrate 10 and encourages the print layer applied by the respective print unit 18 to be dried or cured. Depending on the ink and print system used, appropriate drying or curing units can be used in place of the drying units 22.

In FIG. 1B, a method 40 of producing a banknote is described. In a first step 42, a substrate, in the form of a web, is provided to a print press, the print press including a plurality of print units of the same print process type. That is, for example, if the print process type was Gravure, the print units would be Gravure print units, understanding that each individual unit may be different in set up and, perhaps, in the type of ink that it is printing, but the print unit conforms to what a skilled person would recognise as a Gravure print unit. In step 44, the web is passed through each of the plurality of print units. In step 46, at least part of the web is printed in a print run, printing a print layer on to the web. In step 46, at least one of the plurality of print units prints an indicia layer and at least one of the plurality of print units prints a tactile layer. The method 40 can optionally include the further steps described in relation to the print press of FIG. 1A.

Importantly, the method of producing a banknote and print press for producing a plurality of banknotes includes the printing of, at least, an indicia layer and a tactile layer by the printing units 18. The tactile layer can either be a layer intended to provide a specific tactility to one or more design elements, a layer designed to provide the banknote with a particular type of feel, such as a feeling that the material is made of paper, or a combination of both. It may also be that there are multiple tactile layers, which provide one or more of the previous mentioned tactile functions.

In the normal production of a banknote according to this method, more than one of the print units 18 would print an indicia layer. For example, an indicia layer would, typically, be required for each colour on the banknote on each side of the banknote.

An indicia layer, in the context of all embodiments of the invention, is a layer which, alone or in combination with other indicia layers, provides indicia, being one or more design elements which give context to the bank or country of issue, the currency and/or the associated denomination, or other recognisable element, such as text, numbering, images of portraits, objects or scenes, and the like. Typically, a banknote features a prominent person from the country of issuance, along with numerals indicating the denomination, and one or more indicia layer(s) would provide these types of features. Importantly, an indicia layer is not considered to be an opacifying layer, even if the indicia layer has some effect on the opacity of the banknote, as its intended purpose is not to opacify but to provide a visual design or indicia. The term "indicia" as used elsewhere in this specification, should be interpreted as described above.

A tactile layer, in the context of all embodiments of the invention, is a layer which imparts a measure of increased tactility over the substrate and/or the layer on which it is deposited. For example, if the substrate on which the tactile layer is being printed has a coefficient of friction of 0.1, then the tactile layer would be expected to provide a higher coefficient of friction. A tactile layer intended to provide a "paper-feel", has characteristics designed to mimic the feel of paper banknotes, as outlined above. A tactile layer which is an enhanced tactility layer provides additional tactility. In, at least, some embodiments, this enhanced tactility layer is intended to provide an "intaglio-like" feel, being the tactility which is provided by intaglio print on known banknotes.

The indicia layers provided in this method may have much tighter tolerances than in prior art banknotes. For example, on a Gravure print press, as the print layers are being printed in-line, registration tolerances are around 100 microns and a maximum of 300 microns, compared with around 1.4 mm, or 1400 microns, with prior art banknotes which require separate print processes.

Print press 14 includes, in addition to the plurality of gravure print units 18, one or more further print units 19 of a different print process type. As depicted in FIG. 1A, substrate 10 is fed to ink jet print units 19, which each apply an ink jet print layer to the substrate 10 in the same print run in which gravure print units 18 print gravure print layers on substrate 10. The ink jet print units 19 have corresponding drying or curing units 23, for example a UV lamp to activate the curing of a UV-curable jettable ink printed by ink jet print units 19. It will be appreciated that the further print units may suitably be provided in-line at various locations in print press 14, for example before or after the plurality of gravure print units 18, or interspersed between gravure print units 18 as depicted in FIG. 1A. The use of further print units may provide additional advantages in the method of the invention. In particular, ink jet print units 19 provide the ability to customise each bank note individually, for example by printing a unique serial number or Bar/QR code onto each bank note. Alternatively, the further print units may be used to print one or more further indicia layers, in addition to the indicia layer(s) printed by gravure print units 18. However, while further print units 19 are a preferred feature of the example depicted in FIG. 1A, it will be appreciated that they are not required generally in methods according to the invention.

An example of a suitable ink jet print unit is a Domino Trimatt K600i ink jet printer, configured for web printing. Such printers are capable of printing with UV curable inks which are suitably compatibility with gravure-printed print layers according to embodiments of the invention.

In the example depicted in FIG. 1A, a corona machine 16 is used to promote adhesion of the ink to the web of polymer material. This is the preferred method of promoting adhesion, but other methods may be used, such as plasma treatment or application of an additional adhesion promoting layer. For example, an adhesion promoting layer may be printed, or otherwise provided, onto the web of polymer material. This could be done during manufacture of the polymer material, in a separate process step or in-line with, or by one of, print units 18. However, the corona machine 16 and any alternative methods of promoting adhesion, whilst preferred, are optional. Adhesion promotion is, of course, itself an optional step in the present invention and may or may not be necessary. For example, as discussed below, paper substrates do not need such steps.

Importantly, banknotes, in general, have vastly different adhesion requirements than other printed products. Banknotes are, essentially, a reusable product which is exposed to high wear and chemical exposure environments. As such, they must pass adhesion tests which are much more severe than normal requirements for printed products. For example, a commercially available "crumpling device", specifically for crumpling banknotes, is available from IGT Testing Systems in Singapore. Typically, adhesion is tested after a specified number of "crumples" by a "tape" test, where adhesive tape is placed on the banknote and removed. If the adhesive tape removes more than a specified percentage of the printed ink, the product may be considered to have insufficient adhesion properties. This is a much harsher adhesion test than other security documents as banknotes require much greater adhesion. In addition, banknotes also require to have improved wear characteristics than other security documents, as wear may not be purely related to adhesion. One such method of measuring wear is to use an abraser or abrader to perform accelerated wear testing. For example, a TABER® Rotary Platform Abrasion Tester can be used for such accelerated wear testing.

The substrate 10 is then fed to an inspection system 24. The inspection system 24 images the print layers and quantifies the print quality and registration of the print layers. The inspection system 24 then provides feedback to the print units 18, which can adjust automatically to correct, at least, registration and, in some cases, other issues with print quality. The inspection system 24 also reads a unique identifier printed either on or beside each banknote, so that banknotes printed with detected defects are recorded as such in the system.

The substrate 10 is then fed to a guillotine machine 26 which cuts the substrate 10 into individual banknotes, or, if desired, into sheets of banknotes. In either case, the guillotine machine 26 automatically separates banknotes printed with defects and outputs them into a defect pile 28. Banknotes which are not detected to have any defects are outputted to a finished banknote pile 30.

It will be appreciated that the in-line inspection system 24 and guillotine machine are preferable features of the example described in FIG. 1A. Many of the advantages provided by this method of producing banknotes are achieved by a web fed print press which does not have these in-line systems. In an alternative embodiment, the print press 14 has a rewind system (not shown) after the last print unit and either no in-line inspection system or no guillotine machine or both. These systems can then be provided as off-line process steps to generate the final banknotes.

Furthermore, it will be appreciated that the advantages of printing a banknote using a single print press are mostly achieved even if the banknote has each side printed in separate print processes on the same print press. That is, whilst it is preferred that both sides are printed within a single print run, the benefits of decreased handling, improved adhesion and registration are still achieved when only one side is printed at a time.

In addition, whilst the above method is described as using a polymer material as the substrate, the advantages of the method are achieved using any substrate. That is, faster throughput and less handling, amongst other advantages, are not dependent on the substrate. Using traditional paper as the substrate is also appropriate. However, a polymeric material is preferred as the smoother surface of a polymeric material allows for a higher resolution when printing, as the ink soaks in or travels on paper fibres leading to feathering and a requirement for lower resolution. As discussed elsewhere, the provision of a paper-like feel to a polymer substrate is a particular benefit of embodiments of the invention.

Banknote

Figure 2A:
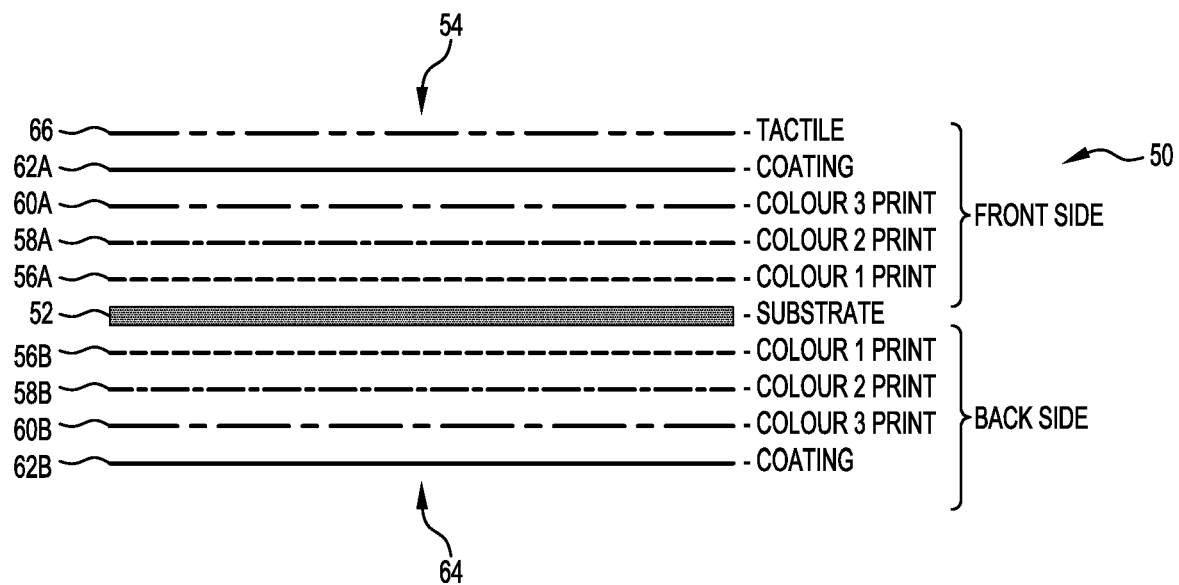
FIG. 2A is an exploded sectional view of a banknote according to one or more aspects of the present invention.

Referring now to FIG. 2A, a schematic of a cross-section of a banknote 50 which is produced, for example, by the method described and print press illustrated according to FIG. 1A and FIG. 1B, is shown. The banknote 50 comprises a substrate 52 of polymer film, which in this example is an opacified polymer film. It is preferably a polymer film which is opacified during manufacture of the film itself by inclusion of an opacifying additive into the polymer during extrusion. That is, the polymer film is opacified due to its bulk properties rather than due to addition of opacifying layers. One such example of a suitable polymer film is a Biaxially-Oriented Polypropylene (BOPP) which has had Titanium Oxide ($TiO_2$) added during manufacture to create a white polymer film. Alternatively, the substrate 52 could be a transparent polymer film opacified by application of one or more opacifying layers, such as Guardian®.

Polymer film opacified in the bulk of the film, rather than by the addition of opacifying layers, has a number of distinct and surprising advantages. Particularly:

during the life of a banknote, one wear characteristic is creasing. In opacified transparent film based substrates, such as Guardian®, creasing such as this causes a loss of adhesion at the point at which the note is creased, creating "creased lines", being lines where the amount of opacifying ink has been reduced or there is no opacifying ink at all. Because polymer film is opacified in the bulk, there is no opacification breakdown due to creasing.

Opacifying inks applied to transparent film are, typically, solvent based inks. Generally, four to six layers of opacifying inks are applied to provide the desired opacity. In addition, these layers are almost full coverage, with the exception of windows or shadow images. As such, there is a significant amount of solvent which must evaporate, which generates a high amount of volatile organic compounds (VOCs) as a by-product of the print process. Using a polymer film which is opacified in the bulk significantly reduces the amount of solvent used, as opacifying inks are not required, and, therefore, significantly reduces the amount of VOCs released, resulting in a more environmentally friendly product and process.

A banknote is, preferably, about 70 to 110 microns thick. For a transparent film with opacifying layers, such as Guardian®, the film is, typically, around 75 microns thick and the remaining thickness is provided by the opacifying layers, giving around 12 to 18 microns of opacifying coatings. For a polymer film which is opacified in the bulk, the light scattering (which provides opacification) has, at least, 70 microns of thickness to scatter the light, rather than only around 18 microns. This results in increased opacity and reduced "showthrough". Showthrough is where, in transmission, it is possible to see features on the opposite side of the banknote. Reduced showthrough is particularly advantageous as it reduces the requirement for indicia on each side of the banknote to be complimentary, avoiding creating an unintended design in transmission.

Opacified layers over a transparent film can also cause mechanical breakdown of other features, such as print or security features, if the integrity of the opacified layer is compromised (such as by crease lines discussed above). A polymer film which is opacified in the bulk prevents these issues from occurring, as it is only the adhesion of the other features to the film which is relevant, not the adhesion of the feature to the opacified layer.

The substrate 52 is preferably 70 to 110 microns thick, further preferably 80 to 100 microns and, most preferably, substantially 90 microns thick. Around 90 microns provides a final banknote product which has properties which is most recognisable by the general public in terms of flexibility, thickness, and feel, to be similar to previously produced banknotes, such as those made of paper. This is particularly the case for polypropylene polymer substrates and, especially, BOPP substrates. This provides greater acceptance by the general public when a new banknote is released. Furthermore, this thickness also provides the best processability by automatic banknote processing machines, as it also matches the thicknesses which automatic banknote processing machines would typically process.

In addition, providing polymer films of this type at thicknesses in excess of 70 microns is difficult and requires significant technical know-how and capital equipment. As such, providers of these speciality polymer films are large entities and can easily be identified. This increases the security of the banknote, as obtaining polymer films of this thickness, and particularly, polypropylene, and even more particularly BOPP, is extremely difficult.

The substrate 52 has a number of print layers applied to each side, each print layer applied using the same print process. That is, each print layer is applied simultaneously or consecutively in the same print run to at least one side of the substrate. In the embodiment of FIG. 2A, a front side 54 of the banknote 50 has indicia layers 56A, 58A and 60A which are three separate colours applied in a desired design. Print layer 62A, in this example is a coating, which is typically applied over the entire banknote, but may be excluded in certain areas, such as windows, and provides some protection to the print layers underneath as well as some other desirable functions, as discussed in more detail below. The preferred embodiment of this coating has a number of distinct advantages, which is discussed in more detail below. In general, the coating is a tactile layer having particles added which provide a both a visual and touch sensation which is similar to paper.

In this example, a back side 64 of the banknote 50 has print layers similar to those described for the front side 54. That is, indicia layers 56B, 58B and 60B are three separate colours applied in a desired design and print layer 62B is a coating which is typically applied on the back side 64. However, it should be appreciated that the indicia layers 56B, 58B and 60B do not have to match the colours or design of the indicia layers 56A, 58A and 60A, nor is there necessarily a tactile layer similar to print layer 66 (discussed below).

On the front side 54, a further print layer 66 is applied over the top coating 62A. The print layer 66 is an enhanced tactility layer which is formed of an ink, or lacquer, or other suitable material, comprising particles. In this case, the particles are of sufficient size to protrude from the lacquer, ink or other suitable material and provide a significantly rougher feel that than of the top coating. The enhanced tactility layer, along with other components of the print layers, forms an important security feature of the banknote 50 and is described in more detail below.

A banknote as described in relation to FIG. 2A, has a number of particular advantages over banknotes that have been previously produced. Firstly, the banknote is produced in a continuous web print process. In one embodiment, the inks used in the web print process are of the same type and all designed for the same type of printing. In an alternative embodiment, the inks are all suitable for a web print process, but are not necessarily of the same print process type. In the preferred example, the inks are all Gravure inks and the print layers are all printed using a Gravure printing process. There are a number of distinct advantages from a banknote consisting of print layers which are suitable for printing in the same web print process, particularly:

1. the inks can all be of the same type and, therefore, they all have the same, or substantially similar, Hansen Solubility Parameters (HSPs), one advantage of which is that the adhesion between print layers is improved compared with print layers printed with different inks and, therefore, relatively different HSP parameters. This advantage manifests itself in improved wear characteristics compared with banknotes having different print processes to lay down ink layers, which means extended life for a banknote produced according to the invention. The details and advantages of a specific type of ink system are discussed in more detail below.
2. Print layers are laid down sequentially, in the case of Gravure and flexographic and other similar print presses, at, typically, relatively high speed, which means that, although a print layer may be sufficiently dried for a further print layer to be added, each print layer is not fully dried/cured when all the print layers have been added. As such, the print layers fully dry or cure whilst in contact with each other creating improved adhesion between the print layers, compared with printing over fully dried/cured print layers, which results in improved resistance to wear.
3. Registration between ink layers can be controlled to a greater degree, reducing the overall tolerances of the system. For example, a typical offset machine will have colour registration variances of +/−1 mm or greater, although a speciality "Simultan" press may have variances as low as 50 microns, and registration between printing steps, on different print presses, would be around 1.4 mm. In, for example, a Gravure print press, the unit to unit tolerances would be, typically, 100 microns and a maximum of 300 microns. As such, using a single type of print process reduces print tolerances significantly, especially between print units.

A further embodiment uses radiation curable inks suitable for web print presses for print layers, preferably UV curable inks. Once again, the preferred further embodiments are radiation curable inks suitable for a Gravure print press. UV curable inks, as well as other radiation curable inks, are inks in which UV (or other radiation) initiates a photochemical reaction that generates a crosslinked network of polymers. Most radiation curable inks do not require solvent allowing for a greater solids loading (as ink retaining elements on print cylinders are not partially taken up with solvent in the ink, which ultimately evaporates). In some instances, a minor amount of solvent may be used to achieve a particular viscosity suitable for printing, but this is a substantially reduced amount of solvent.

As such, advantages of radiation curable inks include: the photochemical reaction which occurs in radiation curable ink is very fast and, as such, there is almost no requirement for drying; being free of solvents means no, or substantially less, VOCs (volatile organic compounds) being released; and radiation curable inks have been found to be very hard wearing, which is a particular advantage for a banknote.

Suitable ink systems, print layers and features for a banknote according to this embodiment are discussed below.

Single Ink System

Banknotes are produced using ink chemistry based upon a number of different ink systems, with the majority of these based upon air oxidation. That is, the majority of banknote inks are oil based inks which oxidise in the presence of air and metal soaps to form cross-linked structures. There is also an increasing use of inks cured using actinic radiation, which requires additional equipment, such as UV lamps.

The inks used for polymeric and hybrid substrates used in security documents are of a different chemistry and usually involve crosslinking using a range of curing chemistries, commonly resulting in a highly cross-linked high molecular weight polymer system. This is because the inks used for traditional paper substrates are able to penetrate the fibres of the paper substrates and, therefore, have relatively good adhesion to the substrate. With a polymer substrate, the traditional inks cannot penetrate the surface and, if they were used, the adhesion of the inks to the polymer substrate is not sufficient to provide a useful lifetime of a banknote. Therefore, a highly-crosslinked system is required such that the ink strongly cross-links to the polymer substrate and provides high durability. The Guardian® substrate provides exactly this system with the ink used also providing a suitable surface for traditional offset and Intaglio inks, as well as ink from other print processes to adhere to. However, on banknotes using the Guardian® substrate, it has been observed that the offset and Intaglio inks on banknotes are more prone to wear than the white inks used to opacify the transparent polymer. That is, the offset and Intaglio inks are more poorly adhered to the opacifying white ink than the opacifying white ink is to the polymer substrate.

There are a number of reasons for this difference in adhesion:
1. Firstly, there is more often than not a considerable period of time (greater than one day) from the time that a opacified polymer substrate for banknotes is produced to the time that it is printed with further processes. This is in part due to the need for the substrate coatings to cure and/or coalesce. During this time, not only does the materials surface increase in molecular weight, it can also decrease in surface energy. These are desirable properties from a robustness and durability point of view. This process, however, reduces the ability of the inks applied to the surface to penetrate the surface and gain full adhesion;
2. Secondly, the disparate nature of the chemistry of the inks applied to the surface in the form of printed indicia further reduces the adhesion between the surface of the material and the indicia inks.
3. Thirdly, the relatively low molecular weight of the cross-linked system of the indicia ink relative to the surface ink results in the indicia ink being softer than the surface materials and therefore more prone to wear relative to the surface material in the same environment.

To overcome the issues raised above, banknotes are increasingly being overcoated with a one or two layer coating system per surface, after printing so as to prevent the indicia from wearing out too quickly. This process is expensive to carry out and does not resolve the issue but tends to minimise it. A hard coating on top of a, relatively, softer coating will stop certain types of wear but not address all wear situations. For example, if a banknote is crumpled regularly, a hard coating will crack and expose the softer coatings underneath to wear.

Accordingly, an embodiment of the invention is to a banknote wherein at least one design layer, or indicia layer, and another printed layer have:
a. Appropriately matching Hansen Solubility Parameters; and/or
b. Curing (molecular weight increased) by at least one crosslinking mechanism, and, preferably, where the crosslinking mechanism involved is not wholly complete between the application of subsequent ink layers.

In addition, an embodiment of the invention is to a method of manufacturing a banknote, having inks described above, where the process of applying the inks is undertaken as an in-line process.

Hansen solubility parameters (HSPs) were developed by Charles M. Hansen in his Ph. D thesis in 1967 (Hansen, Charles (1967), The Three Dimensional Solubility Parameter and Solvent Diffusion Coefficient and Their Importance in Surface Coating Formulation. Copenhagen: Danish Technical Press) as a way of predicting if one material will dissolve in another and form a solution. HSPs are based on the idea that like dissolves like where one molecule is defined as being 'like' another if it bonds to itself in a similar way.

The ability of two polymers to intermingle or entangle, and, therefore, adhere, depends to a large extent, on how "like" they are[2]. HSPs provide suitable parameters to describe how like a polymer is with another and, therefore, how they adhere to each other.

[2]Professor Steven Abbott, Practical Adhesion: https://www.stevenabbott-.co.uk/practical-adhesion/hsp.php Specifically, each molecule is given three Hansen parameters, each generally measured in MPa$^{0.5}$:

δd—The energy from dispersion forces between molecules

δp—The energy from dipolar intermolecular force between molecules

δn—The energy from hydrogen bonds between molecules.

These three parameters can be treated as co-ordinates for a point in three dimensions also known as the Hansen space. The nearer two molecules are in this three-dimensional space, the more likely they are to dissolve into each other. To determine if the parameters of two molecules (usually a solvent and a polymer) are

[2] Professor Steven Abbott, Practical Adhesion: https://www.stevenabbott-.co.uk/practical-adhesion/hsp.php within range, a value called interaction radius ($R_0$) is given to the substance being dissolved. This value determines the radius of the sphere in Hansen space and its centre is the three Hansen parameters. To calculate the distance (Ra) between Hansen parameters for two samples 1 and 2 in Hansen space the following formula is used:

$$Ra^2 = 4(\delta_{d1}-\delta_{d2})^2 + (\delta_{p1}-\delta_{p2})^2 + (\delta_{h1}-\delta_{h2})^2$$

From this equation it can be seen that if all three parameters for samples 1 and 2 are close, then Ra is small and mutual solubility/compatibility is high, therefore adhesion to each other is high. If one or more values differ greatly then the Ra is large and mutual solubility is low and adhesion is low.

Combining this with the interaction radius gives the Relative Energy Difference (RED)[3] of the system:

RED=Ra/$R_0$

RED<1 the molecules are alike and will dissolve

RED=1 the system will partially dissolve

RED>1 the system will not dissolve

The Hansen solubility parameters of a typical offset and Intaglio ink resin was analysed and the following results were found:

| sample | dD | dP | dH | radius | fit |
| --- | --- | --- | --- | --- | --- |
| Ink Offset | 18.22 | 13.52 | 20.82 | 6.7 | 0.983 |
| Ink Intaglio | 18.63 | 10.51 | 22.59 | 6.5 | 1.000 |

A number of inks have been found to be, generally suitable, for polymer substrates through extensive trial and error. The Hansen solubility parameters of the resins for those inks were found to be:

[3] See HSP Basics (https://www.hansen-solubility.com/HSP-science/basis-c.php). The HSP Sphere (https://www.hansen-solubility.com/HSP-science/sphere.php) and/or Hansen solubility parameter on Wikipedia (https://en.wikipedia.org/wiki/Hansen_solubility_parameter)

| sample | dD | dP | dH | radias | fit |
| --- | --- | --- | --- | --- | --- |
| Var Polyester/Polyol | 17.97 | 9.21 | 5.9 | 8.3 | 0.931 |
| VMCH Vinyl resin | 17.76 | 10.76 | 6.59 | 6.2 | 0.948 |
| VAGH Vinyl resin | 18.62 | 10.81 | 6.89 | 6.4 | 0.983 |

As can be seen, when comparing the offset and intaglio resins and resins suitable for polymer substrates, there is a significant difference in the "Hydrogen bonding" parameter, δh (dH in the tables above). The difference in δh being around 15 between the Offset and Intaglio resins and the resins suitable for polymer substrates.

Calculating Ra values for the resins tested give the following:

| Ra | Offset | Intaglio | Polyester | VMCH | VAGH |
|---|---|---|---|---|---|
| Offset | 0 | 3.515836 | 15.53206 | 14.50249 | 15.17692 |
| Intaglio | 3.515836 | 0 | 16.75356 | 16.02559 | 16.70306 |
| Polyester | 15.53206 | 16.75356 | 0 | 1.709591 | 1.691922 |
| VMCH | 14.50249 | 16.02559 | 1.709591 | 0 | 1.034456 |
| VAGH | 15.17692 | 16.70306 | 1.691922 | 1.034456 | 0 |

This provides the following RED values:

| RED | Offset | Intaglio | Polyester | VMCH | VAGH |
|---|---|---|---|---|---|
| Offset | 0 | 0.540898 | 1.871333 | 2.339111 | 2.371394 |
| Intaglio | 0.524752 | 0 | 2.018501 | 2.584772 | 2.609853 |
| Polyester | 2.318218 | 2.57747 | 0 | 0.27574 | 0.264363 |
| VMCH | 2.16455 | 2.465475 | 0.205975 | 0 | 0.161634 |
| VAGH | 2.265212 | 2.569701 | 0.203846 | 0.166848 | 0 |

Using the Offset resin and the polyester resin in the table of resins suitable for polymer substrates, this gives a Ra value of 15.6, which gives a RED, $Ra/R_0$, of 15.6/6.7=2.32 and a clear indication that the two resins are not compatible and adhesion would be low.

As such, in the broadest context, the embodiment of this invention is to a banknote having a two or more printed ink layers, at least one of which is an indicia layer, each ink layer being an ink having a RED (Relative Energy Difference) less than or equal to 1 to the other ink and, more preferably, less than 0.5. In some embodiments, at least another of the print layers is a tactile layer, such as a paper-feel layer or an enhanced tactility layer as described herein. Preferably, the inks have a Hansen Solubility "Hydrogen bonding" parameter $\delta h$ having a difference of less than 2.5. Another embodiment of this invention is to a banknote in which all indicia ink layers have a RED (Relative Energy Difference) less than or equal to 1 to all of the other indicia ink layers. Preferably, all of the indicia ink layers have a Hansen Solubility "Hydrogen bonding" parameter $\delta h$ having a difference of less than 2.5.

Furthermore, an embodiment of this invention is to a banknote having an indicia layer in which the ink has Hansen Solubility parameters within the following ranges: $\delta d$—between 17 and 19, $\delta p$—between 9 and 11 and $\delta h$—between 5 and 7.

It should be appreciated that the Hansen Solubility parameters, and any corresponding RED value, of an ink, as described above, refers to the Hansen Solubility parameters of the relevant resin system of the ink, often referred to as the binder. All inks have other components added, such as pigments and other additives dispersed in the binder. Prior to being applied/printed, an ink also includes one or more solvents, that is the binder is kept from hardening by being dissolved in a solvent. However, the solvent evaporates during drying leaving the binder and any other additives. These additives are often completely insoluble and, therefore, do not contribute to the adhesion in the manner described above (hence why they are dispersed in the binder). It is the solubility of the binder, and its relative solubility with binders of other inks, which is measured and referred to when Hansen Solubility parameters are referred to above. This can be seen from the tables referred to above, disclosing suitable resins. The table referring to Offset and Intaglio inks also refers to the resins of such systems.

It is preferable that the process used to apply the ink layers is on a continuous web and in-line, such that the ink layers are applied shortly after one another and the drying, or curing mechanism involved is not wholly complete between the applications of ink layers. This increases the adhesion of the ink layers, as there is more opportunity for the layers to dissolve into each other at the boundary, increasing adhesion. This is regardless of the curing mechanism, whether it be solvent evaporation, cross-linking polymerisation or coalescence.

Separate process steps for the production of a banknote create print layers which have less opportunity to cross-link or dissolve into one another and have greater adhesion, which goes to the advantages of a banknote produced by the same printing system, as discussed above. Choosing an ink system with a RED less than or equal to 1, improves the adhesion characteristics even when using disparate process steps, which may be separated in time by a significant period.

Coating

A coating can provide one or more of a number of desirable features to a banknote, particularly:
1. a paper-like feel, for non-paper substrates;
2. anti-static properties;
3. additional wear protection to features which it covers;
4. incorporation of any additional tactile features.

A coating in the form of a protective coating is known from prior art documents, particularly paper banknotes which are often over-coated to increase durability. However, previous overcoats have not been of the same ink system, as is the case here, the advantages and differences of which are discussed above. So, for example, if the banknote has had print layers applied by a Gravure print press, then a Gravure transparent ink is applied. A transparent ink of this type is often referred to as a clear or transparent varnish or lacquer. Furthermore, the coating disclosed below has a number of additional features not disclosed in the prior art.

In an embodiment, a coating is created by adding particles to a transparent ink to give a "paper-like" feel. That is, polymer film is, typically, very smooth and inks applied to a polymer film mirror this smooth surface. The result is a feel to the human touch of a very smooth surface. The sensation of touch is one of the most common factors used to determine both the quality and authenticity of a material. This is especially true for banknotes. Therefore, reproducible tactile surfaces add an additional barrier to counterfeiting. The majority of humans are used to paper banknotes which are fibrous and, relatively, rough. Making a polymer film feel like a paper surface is, therefore, desirable when considering banknotes.

The particles employed in this embodiment are, preferably, 5 to 35 microns in average depth and have an aspect ratio between approximately 1 and 5, when comparing depth to the widest point of the particle but preferably an average depth of 15 microns and an average aspect ratio of 3. The particles are, preferably, polyethylene particles and, particularly polyethylene terephthalate (polyester/PET), which can be made to be non-spherical by forming fibres which are subsequently sliced or cut into particles with aspect ratios greater than 1. Other materials can also be used, such as polypropylene, glass, ceramics and amongst others. The key component of retention of the particle is not the type of particle but the ratio of binder depth to particle size. That is, encapsulation or semi-encapsulation tends to greater retention. Particles which are softer, such as rubber based particles, allow a softer feel, however, polyester based particles are preferred.

It has been found that the ideal average particle depth to binder depth ratio is, ideally, in the range 3:1 to 7:1 and, preferably, 5:1. That is, if the average particle depth is 15 microns, a preferred binder depth is between 2 and 5 microns. Binder depths outside this range still provide a useful product, but either wear or tactility is attenuated. It has also been found, through measurement, that a paper-feel layer which reproduces a suitable likeness to paper banknotes has a note to note coefficient of friction of between 0.2 and 0.4 (both static and kinetic), with a preferred value of 0.3 (static, although kinetic values do not vary greatly from static values).

The binder of the ink (once cured), typically, is at a depth of around 3 microns, such that the average protrusion from the ink of a particle is 12 microns. The composition of the coating is substantially 5% to 20% by weight of particles to transparent ink and, further preferably, 10% to 15%. This has been found during experimentation to give a suitable paper-like feel to an average person's sense of touch.

In a further embodiment, a coating is created by adding conductive particles to a transparent ink, to increase the conductivity of the surface of the banknote and decrease the build-up of static electricity. The conductive particles are, preferably, a fibrous conductive filler being a fibrous core material with a conductive layer formed thereon, such as that disclosed in WO1999010418A1, the contents of which are herein disclosed by reference.

The fibrous conductive filler for use in the invention comprises a core material, for which various inorganic or organic fibrous materials having an average length of 3 to 50 μm, an average fiber diameter of 0.01 to 5 μm and an aspect ratio of 3 to 100. Examples of such materials usable are potassium tetratitanate fiber, potassium hexatitanate fiber, potassium octatitanate fiber, titania fiber, monoclinic titania fiber, aluminum borate fiber, magnesium borate fiber, alumina fiber, wollastonite, xonotlite, silicon nitride fiber, boron fiber, boron fiber, glass fiber, siliceous fiber, carbon fiber, cellulose fiber, polyester fiber and polyamide fiber. Among these, monoclinic titania fiber and potassium hexatitanate fiber are especially suited.

The fibrous conductive filler for use in the present invention comprises such a fibrous core material and a conductive layer formed thereon and containing at least a tin oxide and an antimony oxide.

The preferable properties of the particle are a fibrous core material with a conductive layer formed thereon and containing at least a tin oxide and an antimony oxide.

The fibrous conductive filler has a volume resistivity of less than 100 Ωcm, preferably $10^{-2}$ to 10 Ωcm, usually used for coating are 5 to 100 parts by weight of tin oxide and 0.01 to 10 parts by weight of antimony oxide per 100 parts by weight of the core material. Suitable fibrous conductive fillers are available from Otsuka Kagaku Kabushiki Kaisha under the brand name SFS.

A coating containing conductive particles should preferably have a surface resistivity of less than $10^{11}$ Ohms per square, preferably less than $10^{10}$ Ohms per square. Providing a surface resistivity in this range allows for the prevention of static build up in banknotes and, particularly, polymer banknotes. The fibrous conductive filler discussed above is particularly preferred as a conductive particle as it has been found to provide a surface resistivity which is independent of humidity. Other conductive particles provide a surface resistivity which varies according to humidity which causes severe processing problems in dry environments, due to the build-up of static on banknotes.

The problem of static build up is a real issue for banknote processing machines, such as automatic teller machines (ATMs). If static can build up on banknotes, then the banknotes double feed and/or jam in the pathways of the machine.

The surface resistivity could be suitably determined by printing an ink including a specified percentage of particles, testing the resistivity and then iteratively adjusting the amount of particles in subsequent printing inks until the desired value is reached. In addition to these oxides, an indium oxide, a cobalt oxide, etc. are also usable suitably. In this case, each or one of the additional oxides is used in an amount of about 0.01 to about 10 parts by weight per 100 parts by weight of the core material. The average fiber length is of 3 to 50 microns, an average fiber diameter of 0.01 to 5 microns, and an average aspect ratio of 3 to 100. The preferred average fiber length is substantially 4 microns, the preferred average diameter is substantially 0.2 microns and the preferred average aspect ratio is substantially 20.

A fibrous conductive particle, as described above, was initially discounted, as it is not transparent and has a grey colour. This makes it suitable for use in non-transparent inks and not suitable for transparent applications. It was surprisingly found that, at the preferred concentrations of 10% to 15% by weight in the transparent ink, preferably 12%, (when wet, prior to solvents evaporating) the top coating remained transparent and maintained a suitable resistivity.

Whilst it is generally preferable that conductive particles are added to both sides of a banknote, this is not a requirement. Static dissipation may be sufficiently controlled by having the conductive particles on one side only.

An even further surprising embodiment of the coating was found when both the "paper-feel" particles discussed above and the fibrous conductive particles discussed above were provided to a transparent ink. It was found that the transparency, paper-feel and conductivity were surprisingly maintained, despite the effect of the two different particles on the surface of the banknote.

As such, a preferred embodiment of the coating is a transparent ink having 15% by weight of paper-feel particles and 12% by weight of the fibrous conductive particles, as discussed above. One example of such an ink is:

18% of a resin suitable for use in gravure inks (such as TA24-548A from Hitachi Chemical);

9% cross-linker, such as isocyanates; polyaziridines; zirconium complexes; aluminium acetylacetone; melamines; and/or carbodi-imides;

12% fibrous conductive particles, as described above;

15% paper-feel particles, as described above;

46% solvent, suitable for dissolving the resin and catalyst, such as MEK (methyl ethyl ketone), acetone or ethyl acetate.

Figure 3:
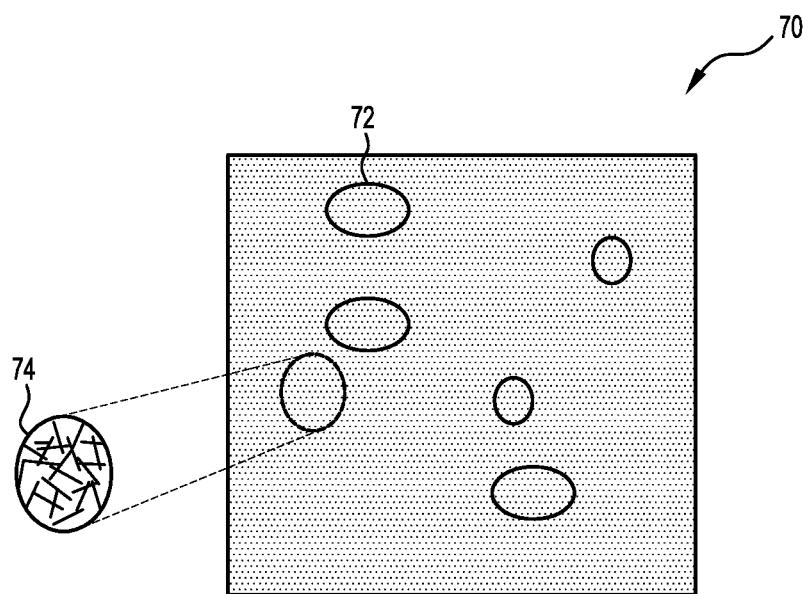
FIG. 3 is a schematic view of a coating according to one aspect of the present invention.

Referring now to FIG. 3, a schematic of a close up of the surface of a banknote in an area where a coating 70 has been applied and comprises paper-feel particles 72, and shown in close up, fibrous conductive particles 74. The fibrous particles 74 substantially cover the surface of the coating 70 including over the paper-feel particles 72. The fibrous conductive particles 74 do not interrupt the paper-like feeling that the coating provides and nor do they substantially affect the transparency of the coating or the colours of previously applied print layers. The paper-feel particles do not interrupt the resistivity of the surface of the coating nor do they substantially affect the transparency of the top coating. As such, a particularly surprising and advantageous coating or varnish is provided.

Clearly, where the substrate used for a banknote is paper, then, the combination of paper-feel particles and conductive particles is not required to change the feel of the substrate.

A further embodiment of a suitable coating combines the coating described above with a tactile feature. That is, the further embodiment combines layers 62A and 66 of FIG. 2A.

It has been found that a paper-feel ink composition, as set out above, can be used as both a paper feel layer and an enhanced tactility layer, either by printing the same ink in two layers, one configured for a coating as described in relation to layer 62A and one configured for a tactile layer as described in relation to layer 66, or, when printed with a suitable printing unit, as a single layer with the ink being deposited at different thicknesses in different regions, dependent on whether a coating is required or a tactile feature is required.

For example, a gravure cylinder can be engraved to deposit an all over paper-feel coating on a banknote in first regions and, thicker, tactile elements in second regions. The cylinder can either be "dual" engraved, such as first engraving the structures for the paper-feel coating all over the first and second regions and then engraving in the second regions only deeper structures to deposit the tactile elements, or the cylinder can simply be engraved in first regions for the paper-feel coating and the second regions for the tactile elements.

Regions in which are intended to only be paper-feel will have a first thickness corresponding to the chosen thickness or coat weight of the coating. For example, a suitable thickness in the first region is between 1.5 microns and 8 microns (ignoring any particle protrusion). Regions which are intended to be "tactile" elements, as described in relation to the tactile security feature below, may have a suitable thickness of between 12 and 30 microns (although the thicker end of that range may only be achievable with certain ink technologies, such as UV, as discussed in more detail below).

Another embodiment of the coating described above is provided with a different ink composition and system. In this embodiment a radiation curable resin system, such as a UV ink or E-beam ink, is used as the base resin. The percentage weight of paper-feel particles or fibrous conductive particles, when the ink is wet, does not change in a suitable composition. For example, a suitable UV ink based coating composition is:

73% UV curable ink, such as SunCure® by Sun Chemical;
12% fibrous conductive particles, as described above;
15% paper-feel particles, as described above.

The composition may be modified, if necessary, by the addition of solvent, such as MEK, to achieve a viscosity of approximately 25 cP to 50 cP, but preferably 40 cP, or 23 seconds using Zahn Cup #2. Alternatively, the composition can be heated to achieve the same viscosities.

It well known that most UV curable inks cannot provide good adhesion to polymer substrates, such as BOPP, without some form of additional adhesion promotion. Suitable adhesion promoters include cross-linkers such as isocyanates; polyaziridines; zirconium complexes; aluminium acetylacetone; melamines; and/or carbodi-imides. A particularly suitable adhesion promoter is described in WO1997027064. In addition, printing a solvent based ink as a primer layer for a UV curable ink, such as the composition above (with or without tactile and conductive particles) also serves as a suitable adhesion promotion layer.

Notably, the UV based ink composition has a number of distinct advantages as indicated above under the "Banknote" section. Particularly, UV based coatings are particularly hard wearing.

Figure 2B:
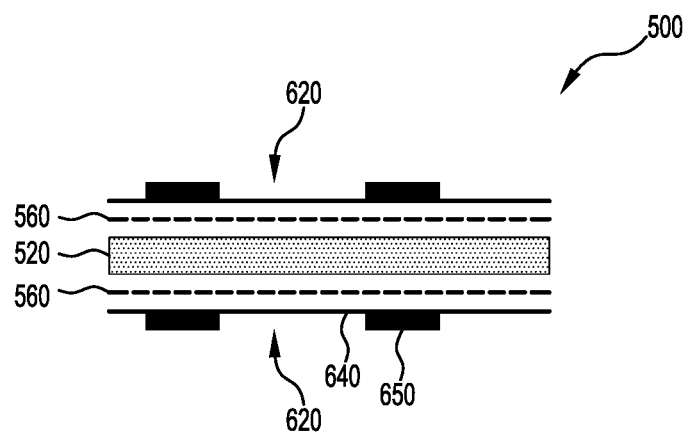
FIG. 2B is a sectional view of a banknote according to one or more aspects of the present invention.

Referring now to FIG. 2B, a banknote 500 is shown having a substrate 520 and indicia layers 560. The indicia layers 560 may be multiple layers of the same or different colours. The substrate 500 may be any substrate suitable for printing a banknote but the preferred substrate is polymer and, particularly an opacified polymer, having opacified particle in the bulk of the substrate.

A tactile layer 620, having a composition as described above, is present on both sides of the substrate and has first regions 640 at a first thickness and second regions 650 at a second thickness. The first regions provide a "paper-feel" to the surface of the banknote and the second regions provide tactility similar to that provided by Intaglio print (as discussed in more detail in relation to the tactile security feature below). Importantly, this combination tactile layer, providing two different types of tactility can be printed in a single step, reducing the required number of print units and, as such, the cost.

Both the solvent based and UV based coatings, whether used as a coating only or as a coating and tactile elements combination, provide additional benefits against wear of a banknote. In experimental tests, a TABER® Rotary Platform Abrasion Tester was used to measure wear resistance, and is a proxy for accelerated wear testing. That is, products which have a higher wear resistance would be more resistant to wear in actual use and last longer.

Test results from the TABER® Abrasion Tester were as set out in the table below.

| Note Description | No. of cycles before failure | Ink Coatings Formulation | Failure description |
|---|---|---|---|
| Indonesian 2000 Rupiah (new, uncirculated, paper substrate printed in 2016) | 60 | Intaglio and offset ink on a paper substrate | Intaglio and offset ink worn away in areas down to the paper substrate (ink completely removed in approximately 50% of the area under wear testing) |

-continued

| Note Description | No. of cycles before failure | Ink Coatings Formulation | Failure description |
|---|---|---|---|
| BOPP substrate - Solvent coating (test sample-newly printed) | 550 | Solvent based inks for design layer, solvent based tactile coating (being the composition described above at a cured thickness of 3 microns). All inks of the same polymer chemistry. | Inks worn away in areas down to the polymer substrate (ink completely removed in approximately 50% of the area under wear testing) |
| BOPP substrate - UV coating (test sample-newly printed) | 1420 | Solvent based inks for design layer, solvent based primer layer (being the composition described above but without any particles at a cured thickness of 1.5 microns), all solvent inks of same chemistry, UV based tactile layer (being the composition described above at a cured thickness of 5 microns) | Worn away in areas down to the substrate (ink completely removed in approximately 50% of the area under wear testing) |

The wear samples above were left in the TABER® Abrasion Tester machine until they reached a condition which would, typically, require withdrawal of a banknote from circulation. The criteria in this case was that approximately 50% of the wear testing area had ink removed from the design elements.

As can be seen from the results, the solvent coating outperformed the paper substrate by over 9 times and the UV coating by over 23 times.

Whilst it may be possible to get different results for wear of a paper substrate based banknote than the sample that was used, it is clear that the coatings as discussed herein provide far in excess of the wear resistance provided by the paper banknote tested and any variances in terms of paper substrate will be minimal. That is, even if a paper banknote was capable of performing twice as well as the one tested, it would still fall short of the wear resistance of the coating that is disclosed herein. It is noted that intaglio print is typically in the 20 to 60 micron range, and this thickness does not appear to assist the wear resistance of the paper banknote.

However, it has been found that the thickness of the coating described herein provides a relationship with wear resistance and can be adjusted accordingly. Applying a thinner thickness of coating will reduce the wear resistance and applying a thicker thickness of coating will increase the wear resistance. Given that banknote failure can occur due to other reasons, such as tearing, increasing wear resistance will give diminishing returns due to other types of failures. However, the thickness of the coating can be used to generate a designed life of the banknote, by measuring wear resistance of existing banknotes and adjusting the thickness of the coating to a chosen multiple of that wear resistance.

Tactile Security Feature

As mentioned above, print layer 66 of FIG. 2A is a tactile print layer. The tactile print is provided in a chosen design and forms a part of a tactile security feature. The tactile security feature provided is a pseudo-intaglio feature. That is, intaglio print provides print structures which are relatively deep (in the order of 20 to 150 microns) and has been provided on banknotes for a considerable length of time, and the tactile security feature mimics this. The depth of the intaglio print structures creates a particular feel to a banknote which, due to the regularity of use of Intaglio printing, the public recognise. Therefore, if a banknote is to be created by an alternative print process, it is desirable to have a feature which feels like intaglio printing to the public.

Figure 4A:
FIG. 4A is a graphical representation of an indicia layer of an embodiment of a tactile security feature according to one aspect of the present invention.
Figure 4B:
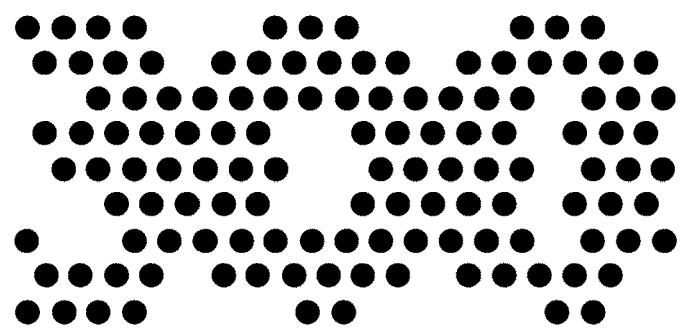
FIG. 4B is a graphical representation of an enhanced tactility layer of an embodiment of a tactile security feature.
Figure 4C:
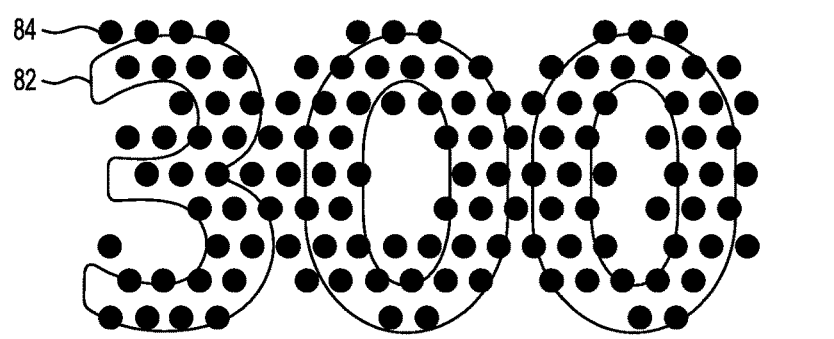
FIG. 4C illustrates the enhanced tactility layer of FIG. 4B overlapping the indicia layer of FIG. 4A.

In this embodiment, and with reference to FIGS. 4A, 4B and 4C, a tactile security feature 80 is provided. The tactile security feature 80 comprises a printed indicia layer 82 and a printed enhanced tactility layer 84. It is preferred that both of the indicia layer 82 and enhanced tactility layer 84 are printed using the same print process. Preferably, they are printed in series on a print press, which is, preferably, a Gravure print press, such as illustrated in FIG. 1A.

However, the tactile security feature as described herein is new and inventive in its own right, in that a feeling of enhanced tactility is provided to a design without requiring the use of Intaglio printing to print that design. There are further advantages when the security feature is applied as part of the same process, as it provides an alternative to requiring separate print processes. This is of particular concern when Intaglio printing is considered for banknotes, as it is usually required that the sheets of banknotes, after being Intaglio printed are not stacked at all, or only stacked with a minimum number of sheets, to allow time for the Intaglio print to dry/cure. If this is not done, the height advantage of the Intaglio print can be lost due to the weight of the stack of sheets deforming the Intaglio print. Therefore, the "minimum" time between printing and handling is at least three days. In addition, much of the transfer of intaglio ink is due to the pressure used to aid this viscous ink to leave the engravings. This pressure, as high as 10 tonnes/in$^2$, results in a permanent embossing of the substrate. However, the elasticity modulus of polymer is far greater than that of paper and hence there is a compromise between tactility, ink quality and handling issues, often to the detriment of the tactile effect on polymer. That is, the embossing of the substrate can cause process issues at further steps that may be required to produce a banknote, such as numbering or application of other security features or protective coatings.

The indicia layer 82 is printed in a desired colour or colours and a desired pattern, which in the case of FIG. 4A is the text '300'. The enhanced tactility layer 84 is applied in a design or pattern as shown in FIG. 4B, which, in this example, is a pattern of dots or circles, generally, in the shape of the text '300', overlapping/overlying the design layer 82, as shown in FIG. 4C. The '300' shape is thus an enhanced tactility area of layer 84, comprising the dots as sub-areas thereof, which is printed on the underlying design of indicia layer 82. Whilst the preferred arrangement is the enhanced tactility layer at least overlying the design layer completely, certain designs may not require this and may only require that the enhanced tactility layer overlaps the design layer, such that the enhanced tactility layer partially covers the design layer.

The enhanced tactility layer 84 comprises a transparent ink or lacquer with a proportion of tactile particles added to the layer. The particles can be substantially spherical and have an average diameter of between 5 and 70 microns, but, preferably, 20 microns. Suitable spherical particles include those produced by Microchem under the Decosilk Art brand, which are acrylic particles. Particles made from other materials, as indicated in relation to the paper feel layer above, are also appropriate for particles in the tactile layer.

However, the preferred particles are those discussed above in relation to the coating above, being 5 to 35 microns in depth and have an aspect ratio between approximately 1 and 5, when comparing depth to the widest point of the particle but preferably an average depth of 15 microns and an average aspect ratio of 3 and, further preferably, a particle with at least one dimension greater than 150% of the smallest dimension and otherwise as discussed above in relation to the coating.

For the avoidance of doubt, the dots depicted in tactile layer 84 do not represent individual particles but rather each dot comprises a dot of ink containing particles. Each dot therefore provides tactility and the spacing between the dots enhances this tactility.

This combination of indicia layer and enhanced tactility layer creates a security feature which, when handled, feels as if the design layer has enhanced tactility and, substantially, like the indicia layer has been printed by a traditional Intaglio process. Notably, it is not required that the enhanced tactility layer is printed immediately on top of the indicia layer, there may be other layers in between, as long as it is still possible to view the indicia layer clearly. It is preferred, however, that the enhanced tactility layer is the last layer printed on the banknote, which provides the best tactility. In the context of banknote 50, it can be seen that the tactile layer 66 is printed after the coating 62A.

Accordingly, it is preferable that the indicia layer resembles traditional Intaglio print styles, which is, typically, designs made up of a series of lines, and sometimes known as line engraving. In some cases, Intaglio print styles include dots as well as lines. Accordingly, an Intaglio print style is a representation which consists of lines and dots, in a manner which could be engraved into an Intaglio print plate. Therefore, the indicia layer preferably comprises a design composed of a series of lines and, optionally, dots.

Figure 5A:
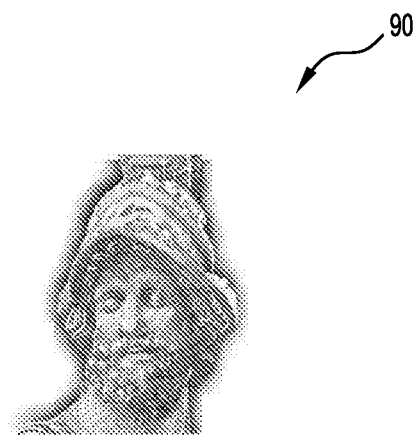
FIG. 5A shows a printed indicia or design element of an embodiment of a tactile security feature according to one aspect of the present invention.

Referring now to FIG. 5A, a traditional Intaglio style print indicia, or design element, 90 is shown. The indicia 90 is a representation of the statue of Menelaus, from the marble sculpture of "Menelaus supporting the body of Patroclus", in the Loggia dei Lanzi, Florence, Italy. As can be seen, the features of the head of Menelaus have been recreated through the use of lines and dots, which could then be used to create an Intaglio printing plate, if desired.

Instead, the design 90 is used as the basis to create an engraving on a Gravure cylinder to create an indicia layer in a security document, preferably, a banknote. To be able to be printed by a gravure cylinder, the design 90 is converted in a known manner to an appropriate cell structure design which is subsequently engraved/etched on to an appropriate cylinder. The cylinder is then used in a gravure print press to print the design onto a suitable substrate.

Figure 5B:
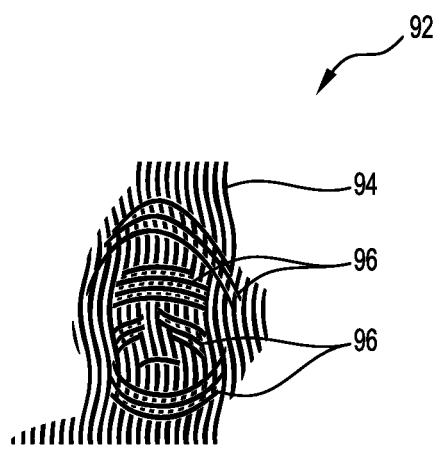
FIG. 5B shows an enhanced tactility layer of an embodiment of a tactile security feature.

As shown in FIG. 5B, a design of an enhanced tactility layer 92 is then generated which, generally, has extremities no greater than the extremities of the indicia 90. The design of enhanced tactility layer 92 comprises a series of undulating vertical lines 94 and a series of design features 96. The design features 96, in this example, are representative of the face and helmet of which are components of the design 90. The design of enhanced tactility layer 92 is then used to create a Gravure printing cylinder, in a similar manner as discussed above for the indicia 90 but taking into account that the ink will contain particles, to create an enhanced tactility layer in the same security document as that of the indicia 90. For example, one method of taking the particles into account is to create cells on the Gravure cylinder which are sufficiently large to hold one or more particles.

Figure 5C:
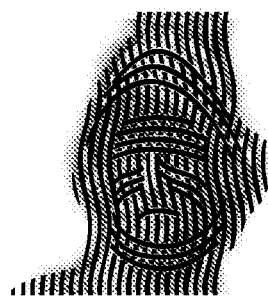
FIG. 5C illustrates a combination of the indicia layer and the enhanced tactility layer of FIG. 5A and FIG. 5B.

The indicia 90 and the enhanced tactility layer 92 are printed in register as shown in FIG. 5C. Being printed in "register", is a term of the printing art, and, in this case, simply means that the enhanced tactility layer overlies the design layer sufficiently for a user to associate the tactile layer with the design layer.

It should be appreciated that the enhanced tactility layer is, preferably, transparent. However, it is possible to use an enhanced tactility layer which is translucent, not fully transparent, or coloured, as long as the indicia layer 90 is visible to the extent that is required.

In this preferred example, the enhanced tactility layer is printed with a transparent ink/lacquer which contains tactile particles that do not affect the viewing of the indicia 90. FIGS. 5B and 5C show the enhanced tactility layer 92 in black for ease of understanding and representation only.

The tactile particles are, as briefly mentioned above in relation to FIG. 2A, preferably, substantially spherical and have an average diameter of approximately 20 microns.

Suitable particle sizes for the purposes of this security feature range from an average particle size of 5 to 70 microns, depending on the degree of roughness which is intended. The particles can be spherical or aspherical but need to be of sufficient size in a relevant direction to provide variance to the surface of the ink in which the particle is deployed when printed. For example, if an aspherical particle is used, such as a platelet type shape, then the particles will tend to orientate with the longer dimension parallel to the surface which is being printed. As such, the dimension of the platelet that is relevant is its depth, which requires to be sufficiently large that a difference in depth is caused compared to areas of the printed ink which contain no particles. Suitable particles include platelet type particles, with at least one dimension greater than 150% of the smallest dimension (usually depth, as the printing process tends to naturally orientate platelet particles in this manner, as mentioned above).

In addition, an alternative embodiment of this tactile security feature includes the use of retroreflective, or semi-retroreflective, beads as the tactile particles. The bead would be of a size as indicated above but has the added security feature that, when exposed to a bright light, such as a camera flash, the beads reflect the bright light, saturating the reflection of the design over which the beads have been printed. As such, taking a picture of the security feature with a camera, cellular mobile phone, or similar, results in a bright white area in which the beads have been printed, which tends to obscure the printed design in which it overlays. This provides two separate security aspects: firstly, as a verification feature, such that it can be verified as an authentic security feature; and as a copy resistant feature, such that it is harder to electronically copy a banknote including such a tactile feature.

As indicated above, the tactile security feature herein disclosed provides a number of advantages over traditional Intaglio print, particularly, it provides an equivalent tactile security feature which is able to be produced at a faster rate, as it does not require to be considerate of deforming the print feature, and without the requirement to have separate the print process step compared with other features which are being printed. Particularly advantageous, is the production of this feature by gravure printing, which has a higher throughput rate than an Intaglio print press. As such, any substrate which requires such a tactile security feature is appropriate, whether the substrate is paper, polymer, a hybrid of paper/polymer or another material.

Combination of the Above Embodiments

The above embodiments are described in context. However, each of the embodiments is capable of being combined with one or more of the other embodiments. For example, a particularly advantageous banknote includes a combination of ink layers of a single ink system, a tactile security feature and a coating as described above.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

It will be understood that the invention is not limited to the specific embodiments described herein, which are provided by way of example only. The scope of the invention is as defined by the claims appended hereto.

The invention claimed is:

1. A method of producing a plurality of banknotes including:
    providing a substrate, in the form of a web, to a print press including a plurality of print units of the same print process type, wherein the web will pass through each of the plurality of print units, and at least part of the web is printed in a print run, wherein the substrate is a film substrate with polymeric outer surfaces, and the film substrate has a thickness of 70 microns to 110 microns;
    printing a plurality of print layers on to the substrate at the plurality of print units, wherein at least one of the plurality of print layers is an indicia layer and at least another one of the plurality of print layers is a tactile layer,
    wherein the tactile layer is a layer including an ink having tactile particles, and wherein the tactile layer is printed over the indicia layer, such that the plurality of banknotes are formed by the plurality of print layers,
    wherein the indicia layer, or a further indicia layer, includes a design element and the tactile layer is an enhanced tactility layer, or includes regions of enhanced tactility, which is transparent or translucent and has at least a first enhanced tactility area overlapping/overlying the design element, such that the design element appears to have tactility due to the first enhanced tactility area, the design element and the first enhanced tactility area together forming a security feature, and
    wherein the tactile layer is conductive layer.

2. A method as claimed in claim 1, wherein the tactile layer is applied at a first thickness in first regions and a second thickness in second regions, the second regions providing enhanced tactility.

3. A method as claimed in claim 1, wherein the tactile layer includes conductive particles.

4. A method as claimed in claim 1, wherein the first enhanced tactility area has extremities not greater than the extremities of the design element.

5. A method as claimed in claim 1, wherein the enhanced tactility layer is applied at a first thickness in first regions and a second thickness in second regions.

6. A method as claimed in claim 1, wherein one of the print layers is a design layer having a print depth of 5 microns or less.

7. A banknote produced by the method of claim 1.

8. A banknote comprising a substrate and a plurality of print layers printed by the same print process type onto the substrate, wherein the substrate is a film substrate with polymeric outer surfaces, and the film substrate has a thickness of 70 microns to 110 microns, wherein at least one of the plurality of print layers is an indicia layer and at least another one of the plurality of print layers is a tactile layer, wherein the tactile layer is printed over the indicia layer, such that the banknote is formed by the plurality of print layers, wherein the indicia layer, or a further indicia layer, includes a design element and the tactile layer is an enhanced tactility layer, or includes regions of enhanced tactility, which is transparent or translucent and has at least a first enhanced tactility area overlapping/overlying the design element, such that the design element appears to have tactility due to the first enhanced tactility area, the design element and the first enhanced tactility area together forming a security feature, and wherein the tactile layer is conductive.

9. A banknote as claimed in claim 8, wherein the indicia layer has a print depth of 5 microns or less.

10. A banknote as claimed in claim 8, wherein the tactile layer includes an ink having tactile particles.

11. A banknote as claimed in claim 10, wherein the tactile layer has a first thickness in first regions and a second thickness in second regions, the second regions providing enhanced tactility.

12. A banknote as claimed in claim 10, wherein the tactile layer includes conductive particles.

13. A banknote as claimed in claim 8, wherein the first enhanced tactility area has extremities not greater than the extremities of the design element.

14. A banknote as claimed in claim 8, wherein the enhanced tactility layer is applied at a first thickness in first regions and a second thickness in second regions.

* * * * *